(12) United States Patent
Matsumura et al.

(10) Patent No.: US 11,350,441 B2
(45) Date of Patent: May 31, 2022

(54) USER TERMINAL

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Huiling Li, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/255,255

(22) PCT Filed: Jun. 28, 2018

(86) PCT No.: PCT/JP2018/024612
§ 371 (c)(1),
(2) Date: Dec. 22, 2020

(87) PCT Pub. No.: WO2020/003442
PCT Pub. Date: Jan. 2, 2020

(65) Prior Publication Data
US 2021/0127416 A1  Apr. 29, 2021

(51) Int. Cl.
*H04B 7/06* (2006.01)
*H04B 7/08* (2006.01)
*H04W 72/12* (2009.01)
*H04L 1/18* (2006.01)
(Continued)

(52) U.S. Cl.
CPC ....... *H04W 72/1289* (2013.01); *H04L 1/1819* (2013.01); *H04W 8/24* (2013.01); *H04W 24/08* (2013.01)

(58) Field of Classification Search
None
See application file for complete search history.

(56) References Cited

U.S. PATENT DOCUMENTS

2021/0135742 A1 * 5/2021 Garcia ................. H04B 7/0452

FOREIGN PATENT DOCUMENTS

AU       2009231818 A1 * 10/2009   ............ H04W 52/50
CA       3049318 A1 *  7/2018   ............ H04W 24/02

OTHER PUBLICATIONS

3GPP TS 38.300 V15.1.0; "3rd Generation Partnership Project; Technical Specification Group Radio Access Network; NR; NR and NG-RAN Overall Description; Stage 2 (Release 15)"; Mar. 2018 (71 pages).
(Continued)

*Primary Examiner* — Gary Lafontant
(74) *Attorney, Agent, or Firm* — Osha Bergman Watanabe & Burton LLP

(57) ABSTRACT

In order to appropriately configure a Hybrid Automatic Repeat Request (HARQ) process even when communication is performed using a plurality of transmission points, one aspect of a user terminal of the present disclosure includes: a receiving section that receives one or more pieces of downlink control information used for scheduling of downlink shared channels, which are transmitted from a plurality of transmission points, by monitoring a downlink control channel; and a control section that detects a HARQ process number, which is indicated by a HARQ process number field included in the downlink control information and which is managed by one or more independent HARQ entities for each cell.

7 Claims, 13 Drawing Sheets

(51) Int. Cl.
    *H04W 8/24*     (2009.01)
    *H04W 24/08*     (2009.01)

(56) References Cited

OTHER PUBLICATIONS

Extended European Search Report issued in counterpart European Patent Application No. 18924677.0, dated Dec. 14, 2021 (8 pages).
Huawei, HiSilicon; "DL multi-TRP/panel/beam operation in R15"; 3GPP TSG RAN WG1 Meeting #91, R1-1719814 Reno, USA, Nov. 27-Dec. 1, 2017 (3 pages).
Huawei, HiSilicon; "Discussion on the number of HARQ processes"; 3GPP TSG RAN WG1 Meeting #88bis, R1-1704213; Spokane, USA, Apr. 3-7, 2017 (4 pages).
CATT; "Considerations on DL multi-panel and multi-TRP transmission"; 3GPP TSG RAN WG1 Meeting NR#3, R1-1715798; Nagoya, Japan, Sep. 18-21, 2017 (4 pages).

* cited by examiner

Multi-panel

Multi-TRP

USER TERMINAL

TECHNICAL FIELD

The present invention relates to a user terminal in a next-generation mobile communication system.

BACKGROUND ART

In LTE Rel. 10/11, carrier aggregation (CA) for integrating a plurality of component carriers (CC) has been introduced in order to increase the bandwidth. Each component carrier (CC) is configured with the system band of LTE Rel. 8 as one unit. In the carrier aggregation (CA), a plurality of component carriers (CC) of the same radio base station (eNB: eNodeB) are configured in a user terminal (UE: User Equipment).

In LTE Rel. 12, dual connectivity (DC) has been introduced in which a plurality of cell groups (CG) of different radio base stations are configured in a user terminal. Each cell group (CG) is configured to include at least one cell (CC). In the dual connectivity (DC), a plurality of component carriers (CC) of different radio base stations are integrated. For this reason, the dual connectivity (DC) is also referred to as CA between base stations (Inter-eNB CA).

In LTE Rel. 8-12, Hybrid Automatic Repeat Request (HARQ) is used for retransmission control. In the HARQ, according to the reception result of downlink (DL) data, a user terminal feeds back a delivery acknowledgment signal (HARQ-ACK: HARQ-Acknowledgement) regarding the data. The radio base station controls data retransmission based on the fed back HARQ-ACK.

In the uplink in which the carrier aggregation (CA) or the dual connectivity (DC) is configured, there is one independent HARQ entity for each cell (CC) or each cell group (CG) (Non-Patent Literature 1). The HARQ entity manages a plurality of HARQ processes in parallel.

CITATION LIST

Non-Patent Literature

Non-Patent Literature 1: 3GPP TS 38.300 V15.1.0 "Technical Specification Group Radio Access Network; NR; NR and NG-RAN Overall Description; Stage 2 (Release 15)", March 2018.

SUMMARY OF INVENTION

Technical Problem

In future radio communication systems (for example, 5G (5th generation mobile communication system) and NR (New Radio)), it has been studied to perform communication using beam forming (BF). In order to improve communication quality using beam forming (BF), it has been studied to control at least one of signal transmission and signal reception in consideration of a quasi-co-location (QCL) relationship (QCL relationship) between a plurality of signals.

In future radio communication systems, it is also assumed that non-coherent (non-coherent transmission) DL signals (for example, PDSCH (Physical Downlink Shared Channel)) are transmitted cooperatively from a plurality of transmission points. In this case, it is also conceivable to control the scheduling of PDSCHs transmitted from a plurality of transmission points using one or more pieces of downlink control information (DCI: Downlink Control Information) or PDSCHs (Physical Downlink Control Channel).

However, when controlling the scheduling of PDSCHs transmitted from a plurality of transmission points using one or more DCIs or PDSCHs, how to configure and design the HARQ entity and the HARQ process of a user terminal has not been sufficiently studied. If the HARQ process is not performed appropriately, problems such as quality degradation of communication using a plurality of transmission points may occur.

The present invention has been made in view of such points, and it is one of the objects of the present invention to provide a user terminal capable of appropriately configuring a HARQ entity and a HARQ process even when performing communication using a plurality of transmission points.

Solution to Problem

One aspect of a user terminal of the present invention includes: a receiving section that receives one or more pieces of downlink control information used for scheduling of downlink shared channels, which are transmitted from a plurality of transmission points, by monitoring a downlink control channel; and a control section that detects a Hybrid Automatic Repeat Request (HARQ) process number, which is indicated by a HARQ process number field included in the downlink control information and which is managed by one or more independent HARQ entities for each cell.

Advantageous Effects of Invention

According to the present invention, it is possible to appropriately configure a HARQ entity and a HARQ process when performing communication using a plurality of transmission points.

DESCRIPTION OF EMBODIMENTS

Figure 1:
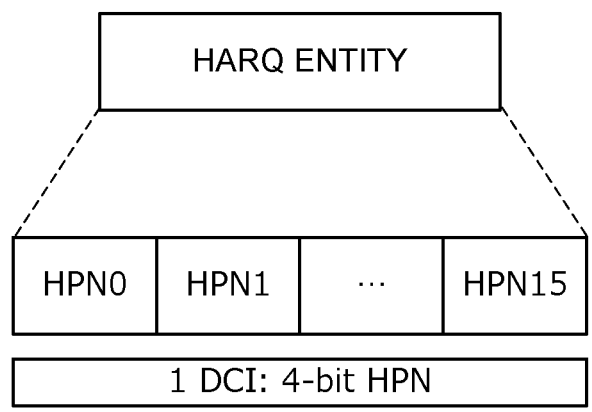
FIG. 1 is a diagram illustrating a relationship among a HARQ entity, a HARQ process, and a DCI in the related art.

In a radio communication system, data transmission is based on scheduling, and scheduling information for DL data transmission is carried in downlink control information (DCI). FIG. 1 is a diagram illustrating a relationship among a HARQ entity, a HARQ process, and a DCI in the related art. As illustrated in FIG. 1, the DCI includes a 4-bit HARQ process number (HPN) field indicating a HARQ process number used for current data transmission. The HARQ entity manages a plurality (up to 16) of HARQ processes in parallel. That is, as HARQ process numbers, there are HPN0 to HPN15. The HARQ process number is also referred to as a HARQ process ID (HARQ process identifier).

A unit of transmitting uplink (UL) data by PUSCH (Physical Uplink Shared Channel) and a unit of transmitting DL data by PDSCH are referred to as a transport block (TB). The transport block (TB) is a unit handled by a MAC (Media Access Control) layer. HARQ (retransmission) control is performed for each transport block (TB).

A user terminal transmits information indicating ACK/NACK (Positive Acknowledgement/Negative Acknowledgement) of HARQ, which indicates whether or not decoding of the DL transport block received using PDSCH is successful, to a radio base station using PUCCH (Physical Uplink Control Channel) or PUSCH.

When a plurality of pieces of UL data or a plurality of pieces of DL data are not spatially multiplexed in a physical layer, a single HARQ process corresponds to one transport block (TB). When a plurality of pieces of UL data or a plurality of pieces of DL data are spatially multiplexed in a physical layer, a single HARQ process corresponds to one or more transport blocks (TB).

In future radio communication systems (for example, Rel. 16 and later), it has been studied to perform non-coherent DL transmission (for example, PDSCH transmission) from each of a plurality of transmission points. Transmitting non-coherent DL signals or DL channels cooperatively from a plurality of transmission points is also referred to as NCJT (Non-coherent Joint Transmission). In this specification, a transmission point (TP) may be read as a transmission reception point (TRP), a panel, or a cell. The transmission point (TP) or the panel can be replaced by, for example, a beam, a spatial filter, an RS resource, quasi co-location (QCL) or transmission configuration information (TCI), or a concept in which these are grouped.

Figure 2A:
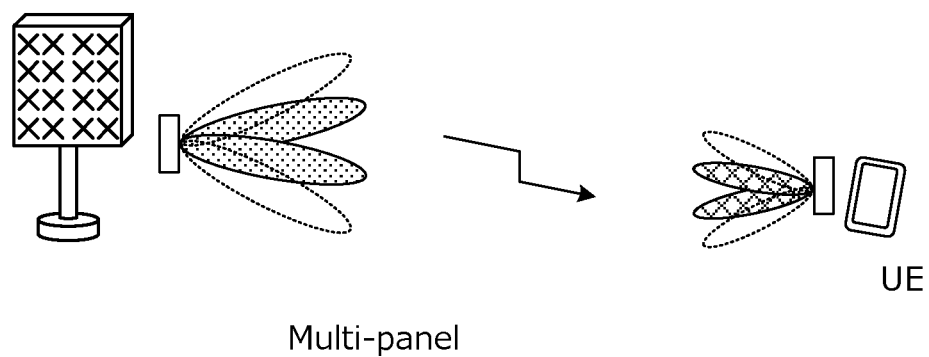
FIGS. 2A and 2B are diagrams illustrating an example of a case where PDSCHs are transmitted from a plurality of transmission points.
Figure 2B:
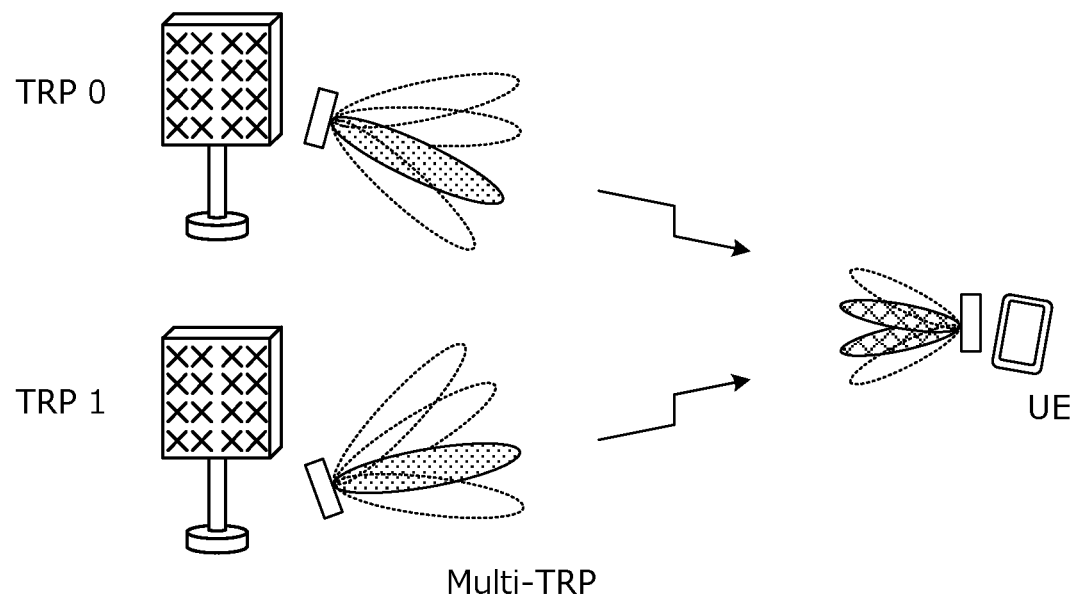

FIG. 2 is a diagram illustrating an example of a case where PDSCHs are transmitted from a plurality of transmission points. FIG. 2A illustrates a case where PDSCHs (for example, PDSCHs using NCJT) are transmitted from a plurality of panels to a user terminal. FIG. 2B illustrates a case where PDSCHs (for example, PDSCHs using NCJT) are transmitted from a plurality of transmission reception points (TRP0 and TRP1) to a user terminal.

In the example illustrated in FIG. 2B, the TRP0 and the TRP1 transmit PDCCHs to the user terminal to schedule PDSCHs separately. In this case, the user terminal needs to receive two PDCCHs and two PDSCHs. That is, the user terminal should have the ability to monitor the PDCCHs transmitted from the TRP0 and the TRP1. The user terminal should have the ability to decode the PDSCHs transmitted from the two TRPs when scheduled by the PDCCHs.

Assumption 1: scheduling of non-coherent PDSCHs transmitted from a plurality of transmission points is controlled using a single downlink control channel (for example, PDCCH) or single downlink control information (DCI). That is, the user terminal can monitor a single PDCCH or a single DCI transmitted from each of the plurality of transmission points and decode the PDSCH transmitted from each of the plurality of transmission points.

Assumption 2: scheduling of non-coherent PDSCHs transmitted from a plurality of transmission points is controlled using a plurality of downlink control channels (for example, PDCCHs) or a plurality of pieces of downlink control information (DCI). That is, the user terminal can monitor a plurality of PDCCHs or a plurality of DCIs transmitted from each of the plurality of transmission points and decode the PDSCH transmitted from each of the plurality of transmission points.

In the case of Assumption 2, it is also conceivable to configure the DCI separately for the scheduling of the PDSCH transmitted from each transmission point (for example, a panel or a TRP). For example, a first DCI #A for scheduling the PDSCH transmitted from a transmission point #A and a second DCI #B for scheduling the PDSCH transmitted from a transmission point #B may be transmitted to the user terminal.

Which of the above-described Assumption 1 and Assumption 2 is applied depends on the assumption of backhaul latency between a plurality of transmission points. Either or both of the above-described Assumption 1 and Assumption 2 may be defined in the specification and configured in the user terminal by higher layer signaling.

As described above, when the PDSCHs (for example, PDSCHs using NCJT) are transmitted from a plurality of transmission points, how to configure and design the HARQ entity and the HARQ process for the user terminal becomes a problem.

Therefore, the present inventors have found a method for appropriately configuring and designing the HARQ entity and the HARQ process for the user terminal when the PDSCHs (for example, PDSCHs using NCJT) are transmitted from a plurality of transmission points.

Hereinafter, the present embodiment will be described in detail with reference to the accompanying diagrams. The term transmission point (TP) in the following description may be read as at least one of a panel and a transmission reception point (TRP).

The term PDCCH in the following description may be read as NR-PDCCH. Similarly, the term PDSCH may be read as NR-PDSCH.

First Aspect

In a first aspect, a user terminal is configured to maintain a HARQ entity for each cell in a scenario in which PDSCHs (for example, PDSCHs using NCJT) are transmitted from a plurality of transmission points.

(Option 1)

In Option 1, the number of HARQ processes managed in parallel for each HARQ entity is the same as that in the related art. That is, up to 16 HARQ processes are managed in parallel for each HARQ entity.

FIG. 3 is a diagram illustrating an example of the configuration of a HARQ entity and a HARQ process according to Option 1 of the first aspect.

Figure 3A:
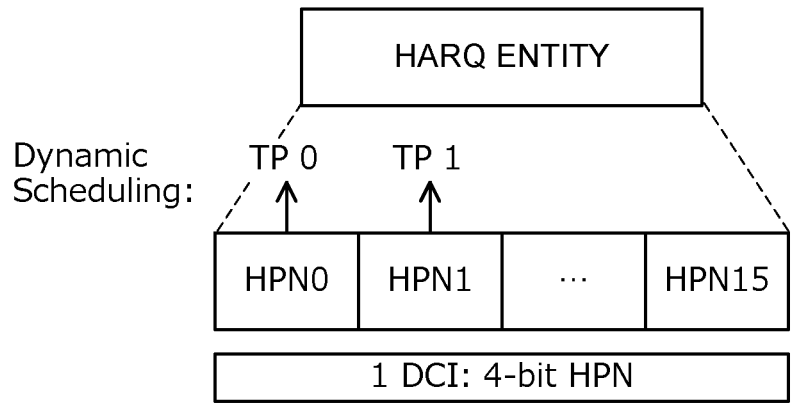
FIGS. 3A and 3B are diagrams illustrating an example of the configuration of a HARQ entity and a HARQ process according to Option 1 of a first aspect.

The example illustrated in FIG. 3A is a case of Assumption 1: scheduling of PDSCHs transmitted from a plurality of transmission points is controlled using a single downlink control channel (for example, PDCCH) or single downlink control information (DCI).

In the example illustrated in FIG. 3A, there is one independent HARQ entity for each cell. The HARQ entity is configured to manage a plurality of (up to 16) HARQ processes in parallel. A plurality of (up to 16) HARQ processes are supported by one DCI. That is, one DCI includes a 4-bit HARQ process number (HPN) field. As HARQ process numbers, there are HPN0 to HPN15.

Each of the plurality of transmission points generates a downlink control channel (for example, PDCCH) based on the downlink resource allocation used for data transmission and the information used for HARQ control including the HARQ process number, and transmits the downlink control channel to the user terminal.

In the example illustrated in FIG. 3A, a transmission point TP0 configures a HARQ process from up to 16 HARQ processes, maps the value (HPN0 in FIG. 3A) of the HARQ process number corresponding to the HARQ process to the DCI format field, and transmits the result to the user terminal. Similarly, a transmission point TP1 configures a HARQ process from up to 16 HARQ processes, maps the value (HPN1 in FIG. 3A) of the HARQ process number corresponding to the HARQ process to the DCI field, and transmits the result to the user terminal.

Figure 3B:
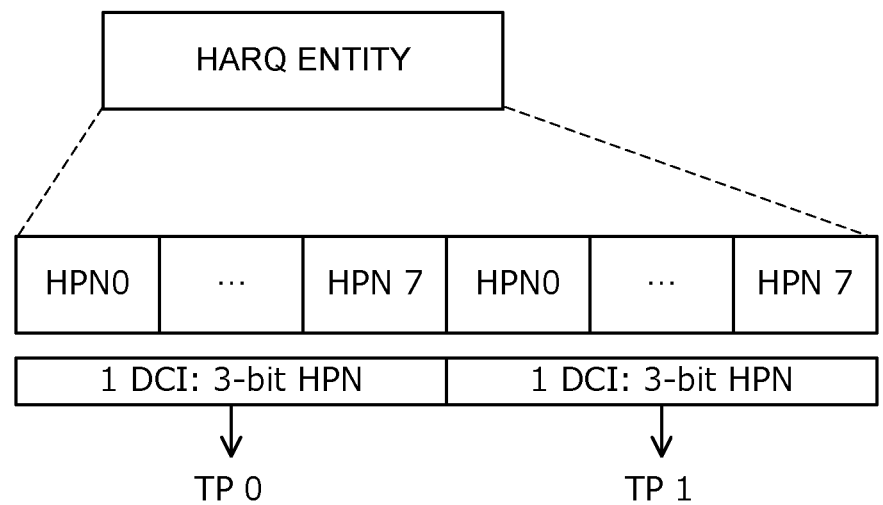

The example illustrated in FIG. 3B is a case of Assumption 2: scheduling of non-coherent PDSCHs transmitted from a plurality of transmission points is controlled using a plurality of downlink control channels (for example, PDCCHs) or a plurality of pieces of downlink control information (DCI).

In the example illustrated in FIG. 3B, there is one independent HARQ entity for each cell. The HARQ entity is configured to manage a plurality of (up to 16) HARQ processes in parallel. A plurality of (up to 16) HARQ processes are supported by a plurality of DCIs.

For example, when PDSCHs are transmitted from up to two transmission points (for example, up to two panels or up to two transmission reception points), two PDCCHs or two DCIs are used for PDSCH scheduling. In this case, one DCI may support up to eight HARQ processes. Therefore, the HARQ process number (HPN) field included in the DCI is reduced to three bits. The one bit reduced in the DCI field can be reused for other purposes.

When one DCI supports up to eight HARQ processes, there are HPN0 to HPN7 as HARQ process numbers.

In the example illustrated in FIG. 3B, the transmission point TP0 configures a HARQ process from up to eight HARQ processes, maps the value (one of HPN0 to HPN7 in FIG. 3B) of the HARQ process number corresponding to the HARQ process to the DCI format field, and transmits the result to the user terminal. The DCI used herein includes a 3-bit HARQ process number (HPN) field. Similarly, the transmission point TP1 configures a HARQ process from up to eight HARQ processes, maps the value (one of HPN0 to HPN7 in FIG. 3B) of the HARQ process number corresponding to the HARQ process to the DCI format field, and transmits the result to the user terminal.

In the example illustrated in FIG. 3B, one DCI includes a 3-bit HARQ process number (HPN) field, but the number of bits in the HARQ process number (HPN) field is not limited thereto.

In the example illustrated in FIG. 3B, each DCI supports the same number of HARQ processes. However, each DCI may support a different number of HARQ processes. When each DCI supports a different number of HARQ processes, the number of bits in the HARQ process number (HPN) field included in each DCI may be different.

In FIG. 3, the term "TP" meaning a transmission point may be read as a panel, a transmission reception point, a PDCCH control resource set (CORESET: Control Resource Set), a search space, a PDSCH DMRS (Demodulation Reference Signal) port group, a codeword, or a transport block (TB).

In Option 1, "Assumption 1" may be configured in the user terminal by higher layer signaling. In this case, the user terminal operates assuming that one DCI includes a 4-bit HARQ process number (HPN) field, as illustrated in FIG. 3A.

The user terminal monitors a single downlink control channel (for example, PDCCH) or single downlink control information (for example, DCI) transmitted from each of a plurality of transmission points (TP0 and TP1 in FIG. 3A). When the user terminal detects a PDCCH having a DCI transmitted from the plurality of transmission points, the user terminal decodes the corresponding PDSCH indicated by the DCI. The user terminal specifies a HARQ process indicated by the DCI format assuming that the DCI includes a 4-bit HARQ process number (HPN) field, and performs the HARQ process for the downlink transport block (TB).

In Option 1, "Assumption 2" may be configured in the user terminal by higher layer signaling. In this case, the user terminal operates assuming that each DCI includes a 3-bit HARQ process number (HPN) field, as illustrated in FIG. 3B.

The user terminal monitors a plurality of downlink control channels (for example, PDCCHs) or plurality of pieces downlink control information (for example, DCIs) transmitted from each of a plurality of transmission points (TP0 and TP1 in FIG. 3B). When the user terminal detects a PDCCH having a DCI transmitted from the plurality of transmission points, the user terminal decodes the corresponding PDSCH indicated by the DCI. The user terminal specifies a HARQ process indicated by the DCI format assuming that the DCI includes a 3-bit HARQ process number (HPN) field, and performs the HARQ process for the downlink transport block (TB).

In Option 1, from the state in which "Assumption 1" is configured in the user terminal by higher layer signaling, "Assumption 2" may be configured in the user terminal by the higher layer signaling. In this case, the user terminal can switch from an operation when it is assumed that one DCI includes a 4-bit HARQ process number (HPN) field to an operation when it is assumed that each DCI includes a 3-bit HARQ process number (HPN) field.

In Option 1, from the state in which "Assumption 2" is configured in the user terminal by higher layer signaling, "Assumption 1" may be configured in the user terminal by the higher layer signaling. In this case, the user terminal can switch from an operation when it is assumed that each DCI includes a 3-bit HARQ process number (HPN) field to an operation when it is assumed that one DCI includes a 4-bit HARQ process number (HPN) field.

(Option 2)

In Option 2, the number of HARQ processes supported for each HARQ entity increases linearly with the number of PDCCHs, PDSCHs, panels, or transmission reception points. That is, the maximum number of HARQ processes managed in parallel for each HARQ entity changes based on the number of PDCCHs, PDSCHs, panels, or transmission reception points.

The capability of the user terminal with respect to the maximum number of HARQ processes that can be managed in parallel for each HARQ entity may be signaled from the user terminal to the network and defined. Alternatively, the capability of the user terminal with respect to the maximum number of HARQ processes that can be managed for each transmission point (for each panel, for each transmission reception point), for each cell, or for each carrier may be signaled from the user terminal to the network.

FIG. 4 is a diagram illustrating an example of the configuration of a HARQ entity and a HARQ process according to Option 2 of the first aspect.

Figure 4A:
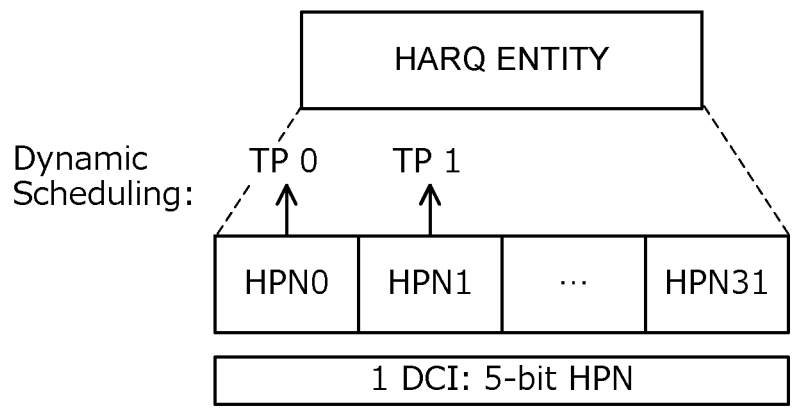
FIGS. 4A and 4B are diagrams illustrating an example of the configuration of a HARQ entity and a HARQ process according to Option 2 of the first aspect.

The example illustrated in FIG. 4A is a case of Assumption 1: scheduling of PDSCHs transmitted from a plurality of transmission points is controlled using a single downlink control channel (for example, PDCCH) or single downlink control information (DCI).

In the example illustrated in FIG. 4A, there is one independent HARQ entity for each cell. The HARQ entity is configured to manage a plurality of HARQ processes in parallel. A plurality of HARQ processes managed by one HARQ entity are supported by one DCI. In order to support a higher HARQ process number, the HARQ process number (HPN) field included in the DCI may be further increased from four bits.

For example, when PDSCHs are transmitted from up to two transmission points (for example, up to two panels or up to two transmission reception points), increasing the HARQ process number (HPN) field included in the DCI to five bits allows one DCI to support up to 32 HARQ processes. When one DCI supports up to 32 HARQ processes, there are HPN0 to HPN31 as HARQ process numbers.

Each of the plurality of transmission points generates a downlink control channel (for example, PDCCH) based on the downlink resource allocation used for data transmission and the information used for HARQ control including the HARQ process number, and transmits the downlink control channel to the user terminal.

In the example illustrated in FIG. 4A, a transmission point TP0 configures a HARQ process from up to 32 HARQ processes, maps the value (HPN0 in FIG. 4A) of the HARQ process number corresponding to the HARQ process to the DCI format field, and transmits the result to the user terminal. The DCI used herein includes a 5-bit HARQ process number field. Similarly, the transmission point TP1 configures a HARQ process from up to 32 HARQ processes, maps the value (HPN1 in FIG. 4A) of the HARQ process number corresponding to the HARQ process to the DCI field, and transmits the result to the user terminal.

In the example illustrated in FIG. 4A, one DCI includes 5-bit HARQ process number (HPN) field, but the number of bits in the HARQ process number (HPN) field is not limited thereto.

Figure 4B:
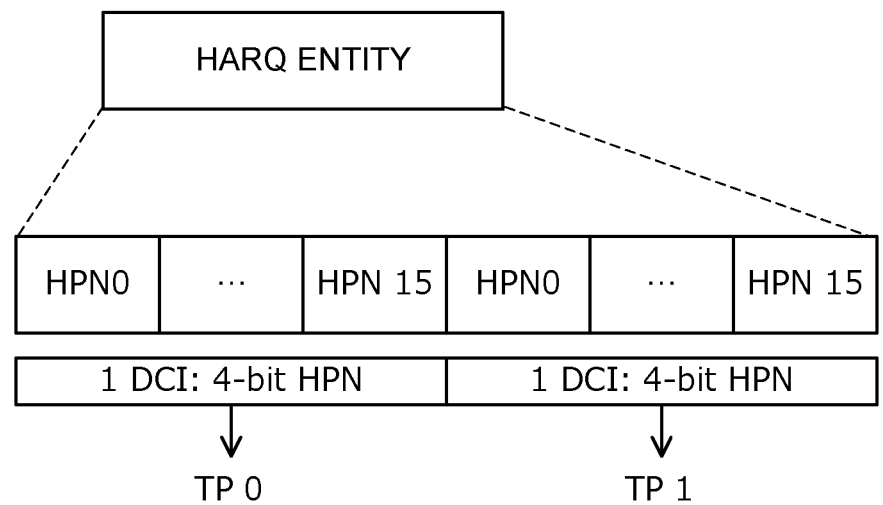

The example illustrated in FIG. 4B is a case of Assumption 2: scheduling of non-coherent PDSCHs transmitted from a plurality of downlink control channels (for example, PDCCHs) or a plurality of pieces of downlink control information (DCI).

In the example illustrated in FIG. 4B, there is one independent HARQ entity for each cell. The HARQ entity is configured to manage a plurality of HARQ processes in parallel. A plurality of HARQ processes are supported by a plurality of DCIs.

For example, when PDSCHs are transmitted from up to two transmission points (for example, up to two panels or up to two transmission reception points), two DCIs are used for PDSCH scheduling. In this case, each DCI may include a 4-bit HARQ process number (HPN) field to support up to 16 HARQ processes. When one DCI supports up to 16 HARQ processes, there are HPN0 to HPN15 as HARQ process numbers.

In the example illustrated in FIG. 4B, the HARQ process number (HPN) field included in the DCI remains unchanged at four bits. That is, the HARQ process number (HPN) field included in the DCI is the same as the example illustrated in FIG. 3A. However, the maximum number of HARQ processes managed in parallel by one HARQ entity increases to 32.

In the example illustrated in FIG. 4B, the transmission point TP0 configures a HARQ process from up to 16 HARQ processes, maps the value (one of HPN0 to HPN15 in FIG. 4B) of the HARQ process number corresponding to the HARQ process to the DCI format field, and transmits the result to the user terminal. The DCI used herein includes a 4-bit HARQ process number field. Similarly, the transmission point TP1 configures a HARQ process from up to 16 HARQ processes, maps the value (one of HPN0 to HPN15 in FIG. 4B) of the HARQ process number corresponding to the HARQ process to the DCI format field, and transmits the result to the user terminal.

In the example illustrated in FIG. 4B, one DCI includes a 4-bit HARQ process number (HPN) field, but the number of bits in the HARQ process number (HPN) field is not limited thereto.

In the example illustrated in FIG. 4B, each DCI supports the same number of HARQ processes. However, each DCI may support a different number of HARQ processes. When each DCI supports a different number of HARQ processes, the number of bits in the HARQ process number (HPN) field included in each DCI may be different.

In FIG. 4, the term "TP" meaning a transmission point may be read as a panel, a transmission reception point, a PDCCH control resource set (CORESET), a search space, a PDSCH DMRS port group, a codeword, or a transport block (TB).

In Option 2, "Assumption 1" may be configured in the user terminal by higher layer signaling. In this case, the user terminal operates assuming that one DCI includes a 5-bit HARQ process number (HPN) field, as illustrated in FIG. 4A.

The user terminal monitors a single downlink control channel (for example, PDCCH) or single downlink control information (for example, DCI) transmitted from each of a plurality of transmission points (TP0 and TP1 in FIG. 4A). When the user terminal detects a PDCCH having a DCI transmitted from the plurality of transmission points, the user terminal decodes the corresponding PDSCH indicated by the DCI. The user terminal specifies a HARQ process indicated by the DCI format assuming that the DCI includes a 5-bit HARQ process number (HPN) field, and performs the HARQ process for the downlink transport block (TB).

In Option 2, "Assumption 2" may be configured in the user terminal by higher layer signaling. In this case, the user terminal operates assuming that each DCI includes a 4-bit HARQ process number (HPN) field, as illustrated in FIG. 4B.

The user terminal monitors a plurality of downlink control channels (for example, PDCCHs) or plurality of pieces downlink control information (for example, DCIs) transmitted from each of a plurality of transmission points (TP0 and TP1 in FIG. 4B). When the user terminal detects a PDCCH having a DCI transmitted from the plurality of transmission points, the user terminal decodes the corresponding PDSCH indicated by the DCI. The user terminal specifies a HARQ process indicated by the DCI format assuming that the DCI includes a 4-bit HARQ process number (HPN) field, and performs the HARQ process for the downlink transport block (TB).

In Option 2, from the state in which "Assumption 1" is configured in the user terminal, "Assumption 2" may be configured in the user terminal by higher layer signaling. In this case, the user terminal can switch from an operation when it is assumed that one DCI includes a 5-bit HARQ process number (HPN) field to an operation when it is assumed that one DCI includes a 4-bit HARQ process number (HPN) field.

In Option 2, from the state in which "Assumption 2" is configured in the user terminal, "Assumption 1" may be configured in the user terminal by higher layer signaling. In this case, the user terminal can switch from an operation when it is assumed that one DCI includes a 4-bit HARQ process number (HPN) field to an operation when it is assumed that one DCI includes a 5-bit HARQ process number (HPN) field.

Second Aspect

In a second aspect, in a scenario in which PDSCHs (for example, PDSCHs using NCJT) are transmitted from a plurality of transmission points, a HARQ entity for each cell is separately configured for a user terminal corresponding to the plurality of transmission points.

The control protocol RRC (Radio Resource Control) configures the number of HARQ entities for each cell. The RRC configures the association between the HARQ entity and the transmission point.

The capability of the user terminal with respect to the maximum number of HARQ entities that can be configured for each transmission point (for each panel, for each transmission reception point) may be signaled from the user terminal to the network and defined. Alternatively, the capability of the user terminal with respect to the maximum number of HARQ entities that can be configured for each cell or for each carrier may be signaled from the user terminal to the network.

Here, the term "transmission point" may be read as a panel, a transmission reception point, a PDCCH control resource set (CORESET), a search space, a PDSCH DMRS port group, a codeword, or a transport block (TB).

(Option 1)

In Option 1, the number of HARQ processes managed in parallel by each HARQ entity is fixed. For example, the number of HARQ processes managed in parallel for each HARQ entity is the same as that in the related art, and may be up to 16. Alternatively, the total number of HARQ processes for each cell is the same as that in the related art, and may be up to 16. In the latter case, the number of HARQ processes managed in parallel for each HARQ entity is reduced from that in the related art.

FIG. 5 is a diagram illustrating an example of the configuration of a HARQ entity and a HARQ process according to Option 1 of the second aspect.

The example illustrated in FIG. 5 is a case of Assumption 2: scheduling of non-coherent PDSCHs transmitted from a plurality of transmission points is controlled using a plurality of downlink control channels (for example, PDCCHs) or a plurality of pieces of downlink control information (DCI).

Figure 5A:
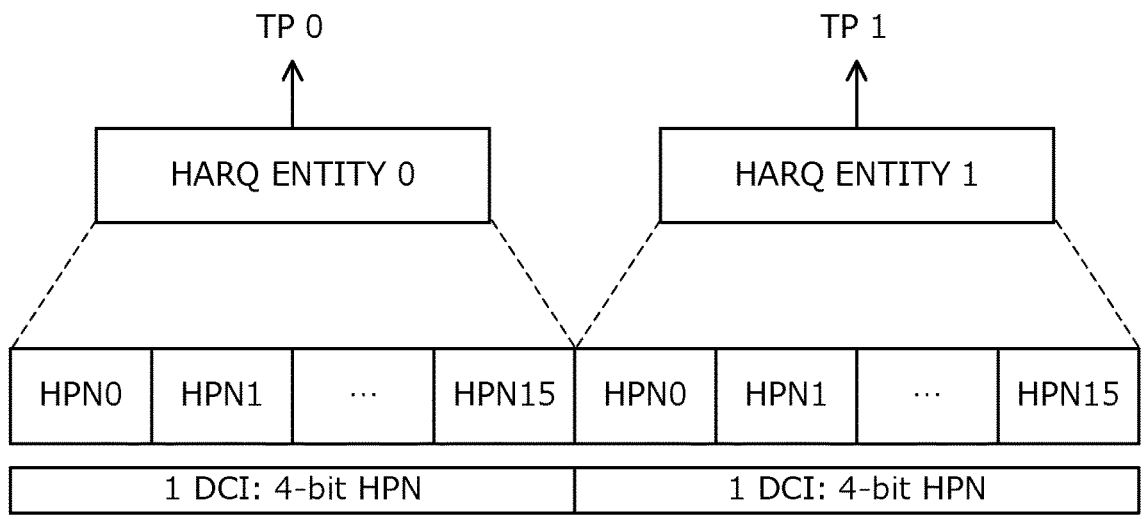
FIGS. 5A and 5B are diagrams illustrating an example of the configuration of a HARQ entity and a HARQ process according to Option 1 of a second aspect.

In the example illustrated in FIG. 5A, a plurality of independent HARQ entities (HARQ entity 0 and HARQ entity 1) are configured by RRC for each cell. Each HARQ entity is configured to manage a plurality of (up to 16) HARQ processes in parallel. A plurality of (up to 16) HARQ processes for each HARQ entity are supported by one DCI. That is, one DCI includes a 4-bit HARQ process number (HPN) field. As HARQ process numbers, there are HPN0 to HPN15.

For example, when PDSCHs are transmitted from up to two transmission points (for example, up to two panels or up to two transmission reception points), the RRC configures two independent HARQ entities for each cell as illustrated in FIG. 5A.

In the example illustrated in FIG. 5A, the HARQ process number (HPN) field included in the DCI remains unchanged at four bits. However, the total number of HARQ processes per cell increases to a maximum of 32.

In the example illustrated in FIG. 5A, the transmission point TP0 configures a HARQ process from up to 16 HARQ processes managed by the HARQ entity 0, maps the value of the HARQ process number corresponding to the HARQ process to the DCI format field, and transmits the result to the user terminal. The DCI format used herein includes a 4-bit HARQ process number (HPN) field. Similarly, the transmission point TP1 configures a HARQ process from up to 16 HARQ processes managed by the HARQ entity 1, maps the value of the HARQ process number corresponding to the HARQ process to the DCI field, and transmits the result to the user terminal.

Figure 5B:
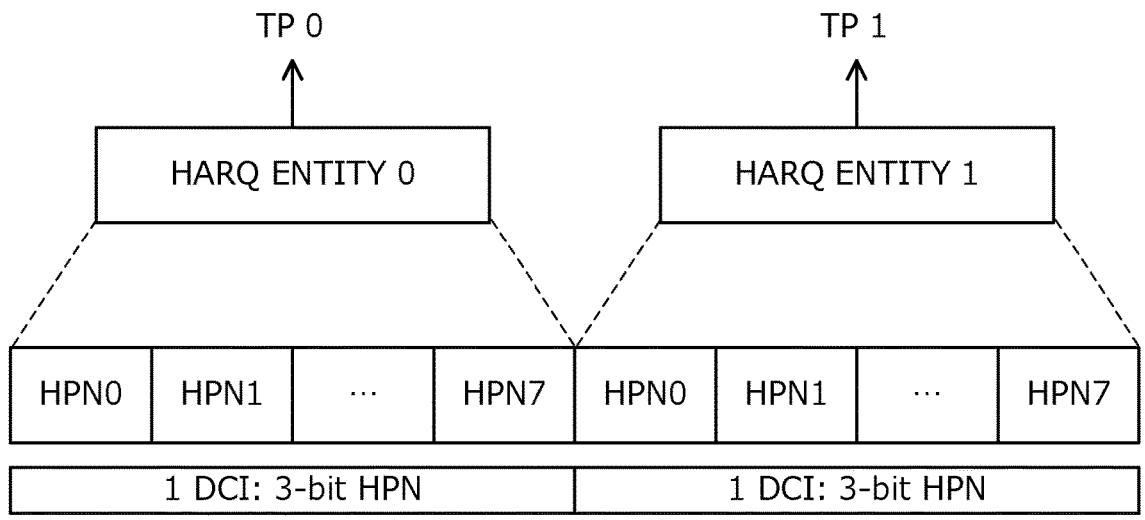

In the example illustrated in FIG. 5B, a plurality of independent HARQ entities (HARQ entity 0 and HARQ entity 1) are configured by RRC for each cell. The total number of HARQ processes per cell is set to a maximum of 16 as in the related art.

For example, when PDSCHs are transmitted from up to two transmission points (for example, up to two panels or up to two transmission reception points), the RRC configures two independent HARQ entities for each cell as illustrated in FIG. 5B. In this case, each HARQ entity may manage up to eight HARQ processes. When each HARQ entity manages up to eight HARQ processes, there are HPN0 to HPN7 as HARQ process numbers.

Up to eight HARQ processes managed by each HARQ entity are supported by one DCI. That is, one DCI includes a 3-bit HARQ process number (HPN) field.

In the example illustrated in FIG. 5B, the transmission point TP0 configures a HARQ process from up to eight HARQ processes managed by the HARQ entity 0, maps the value of the HARQ process number corresponding to the HARQ process to the DCI format field, and transmits the result to the user terminal. The DCI format used herein includes a 3-bit HARQ process number (HPN) field. Similarly, the transmission point TP1 configures a HARQ process from up to eight HARQ processes managed by the HARQ entity 1, maps the value of the HARQ process number corresponding to the HARQ process to the DCI field, and transmits the result to the user terminal.

In the example illustrated in FIG. 5B, each HARQ entity supports the same number of HARQ processes. However, each HARQ entity may support a different number of HARQ processes. When each HARQ entity supports a different number of HARQ processes, the number of bits in the HARQ process number (HPN) field included in each corresponding DCI may be different.

In FIG. 5, the term "TP" meaning a transmission point may be read as a panel, a transmission reception point, a PDCCH control resource set (CORESET), a search space, a PDSCH DMRS port group, a codeword, or a transport block (TB).

In Option 1, "Assumption 2" may be configured in the user terminal by higher layer signaling (for example, RRC signaling), and the number of HARQ entities per cell and information, such as the association between the HARQ entity and the transmission point, may be notified. For example, when the configuration illustrated in FIG. 5A is notified, the user terminal operates assuming that there are two independent HARQ entities for each cell, and operates assuming that one DCI includes a 4-bit HARQ process number (HPN) field.

The user terminal monitors a plurality of downlink control channels (for example, PDCCHs) or plurality of pieces downlink control information (for example, DCIs) transmitted from each of a plurality of transmission points (TP0 and TP1 in FIG. 5A). When the user terminal detects a PDCCH having a DCI transmitted from the plurality of transmission points, the user terminal decodes the corresponding PDSCH indicated by the DCI. The user terminal specifies a HARQ process indicated by the DCI format assuming that the DCI includes a 4-bit HARQ process number (HPN) field, and performs the HARQ process for the downlink transport block (TB).

In Option 1, "Assumption 2" may be configured in the user terminal by higher layer signaling (for example, RRC signaling), and the number of HARQ entities per cell and information, such as the association between the HARQ entity and the transmission point, may be notified. For example, when the configuration illustrated in FIG. 5B is notified, the user terminal operates assuming that there are two independent HARQ entities for each cell, and operates assuming that one DCI includes a 3-bit HARQ process number (HPN) field.

The user terminal monitors a plurality of downlink control channels (for example, PDCCHs) or plurality of pieces downlink control information (for example, DCIs) transmitted from each of a plurality of transmission points (TP0 and TP1 in FIG. 5B). When the user terminal detects a PDCCH having a DCI transmitted from the plurality of transmission points, the user terminal decodes the corresponding PDSCH indicated by the DCI. The user terminal specifies a HARQ process indicated by the DCI format assuming that the DCI includes a 3-bit HARQ process number (HPN) field, and performs the HARQ process for the downlink transport block (TB).

(Option 2)

In Option 2, the number of HARQ processes managed in parallel by each HARQ entity is variable and configured by RRC. Each HARQ entity may manage the same number of HARQ processes or a different number of HARQ processes.

FIG. 6 is a diagram illustrating an example of the configuration of a HARQ entity and a HARQ process according to Option 2 of the second aspect.

The example illustrated in FIG. 6 is a case of Assumption 2: scheduling of non-coherent PDSCHs transmitted from a plurality of transmission points is controlled using a plurality of downlink control channels (for example, PDCCHs) or a plurality of pieces of downlink control information (DCI).

Figure 6A:
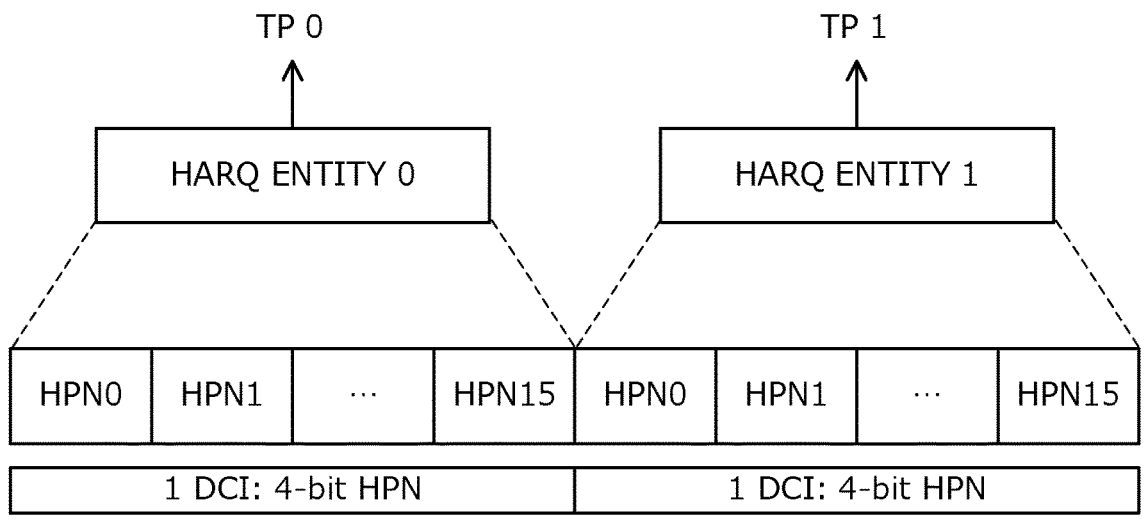
FIGS. 6A and 6B are diagrams illustrating an example of the configuration of a HARQ entity and a HARQ process according to Option 2 of the second aspect.

In the example illustrated in FIG. 6A, a plurality of independent HARQ entities (HARQ entity 0 and HARQ entity 1) are configured by RRC for each cell. Each HARQ entity is configured by the RRC so as to manage the same number (16 in FIG. 6A) of HARQ processes in parallel. A plurality of (up to 16) HARQ processes for each HARQ entity are supported by one DCI. That is, one DCI includes a 4-bit HARQ process number (HPN) field. As HARQ process numbers, there are HPN0 to HPN15. In addition, FIG. 6A is the same as FIG. 5A.

For example, when PDSCHs are transmitted from up to two transmission points (for example, up to two panels or up to two transmission reception points), the RRC configures two independent HARQ entities for each cell as illustrated in FIG. 6A. The RRC sets the number of HARQ processes managed by each HARQ entity.

In the example illustrated in FIG. 6A, the transmission point TP0 sets a HARQ process from up to 16 HARQ processes managed by the HARQ entity 0, maps the value of the HARQ process number corresponding to the HARQ process to the DCI format field, and transmits the result to the user terminal. The DCI format used herein includes a 4-bit HARQ process number (HPN) field. Similarly, the transmission point TP1 configures a HARQ process from up to 16 HARQ processes managed by the HARQ entity 1, maps the value of the HARQ process number corresponding to the HARQ process to the DCI field, and transmits the result to the user terminal.

Figure 6B:
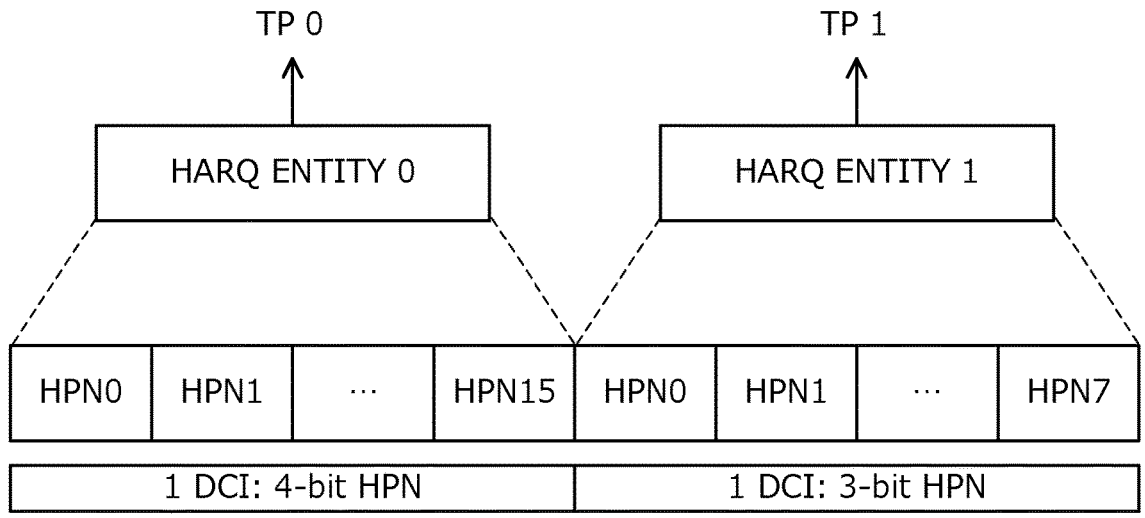

In the example illustrated in FIG. 6B, a plurality of independent HARQ entities (HARQ entity 0 and HARQ entity 1) are configured by RRC for each cell. Each HARQ entity is configured by the RRC so as to manage a different number of HARQ processes in parallel. In FIG. 6B, the HARQ entity 0 is configured to manage 16 HARQ processes in parallel. A DCI corresponding thereto includes a 4-bit HARQ process number (HPN) field. The HARQ entity 1 is configured to manage eight HARQ processes in parallel. A DCI corresponding thereto includes a 3-bit HARQ process number (HPN) field.

For example, when PDSCHs are transmitted from up to two transmission points (for example, up to two panels or up to two transmission reception points), the RRC configures two independent HARQ entities for each cell as illustrated in FIG. 6B. The RRC sets the number of HARQ processes managed by each HARQ entity.

In the example illustrated in FIG. 6B, the transmission point TP0 configures a HARQ process from up to 16 HARQ processes managed by the HARQ entity 0, maps the value of the HARQ process number corresponding to the HARQ process to the DCI format field, and transmits the result to the user terminal. The DCI format used herein includes a 4-bit HARQ process number (HPN) field. The transmission point TP1 configures a HARQ process from up to eight HARQ processes managed by the HARQ entity 1, maps the value of the HARQ process number corresponding to the HARQ process to the DCI field, and transmits the result to the user terminal. The DCI format used herein includes a 3-bit HARQ process number (HPN) field.

In FIG. 6, the term "TP" meaning a transmission point may be read as a panel, a transmission reception point, a PDCCH control resource set (CORESET), a search space, a PDSCH DMRS port group, a codeword, or a transport block (TB).

In Option 2, "Assumption 2" may be configured in the user terminal by higher layer signaling (for example, RRC signaling), and the number of HARQ entities per cell and information, such as the association between the HARQ entity and the transmission point, may be notified. For example, when the configuration illustrated in FIG. 6A is notified, the user terminal operates assuming that there are two independent HARQ entities for each cell, and operates assuming that one DCI includes a 4-bit HARQ process number (HPN) field.

The user terminal monitors a plurality of downlink control channels (for example, PDCCHs) or plurality of pieces downlink control information (for example, DCIs) transmitted from each of a plurality of transmission points (TP0 and TP1 in FIG. 6A). When the user terminal detects a PDCCH having a DCI transmitted from the plurality of transmission points, the user terminal decodes the corresponding PDSCH indicated by the DCI. The user terminal specifies a HARQ process indicated by the DCI format assuming that the DCI includes a 4-bit HARQ process number (HPN) field, and performs the HARQ process for the downlink transport block (TB).

In Option 2, "Assumption 2" may be configured in the user terminal by higher layer signaling (for example, RRC signaling), and the number of HARQ entities per cell and information, such as the association between the HARQ entity and the transmission point, may be notified. For example, when the configuration illustrated in FIG. 6B is notified, the user terminal operates assuming that there are two independent HARQ entities for each cell, and operates assuming that the DCI corresponding to the HARQ entity 0 includes a 4-bit HARQ process number (HPN) field and the DCI corresponding to the HARQ entity 1 includes a 3-bit HARQ process number (HPN) field.

The user terminal monitors a plurality of downlink control channels (for example, PDCCHs) or plurality of pieces downlink control information (for example, DCIs) transmitted from each of a plurality of transmission points (TP0 and TP1 in FIG. 6B). When the user terminal detects a PDCCH having a DCI transmitted from the plurality of transmission points, the user terminal decodes the corresponding PDSCH indicated by the DCI. The user terminal specifies a HARQ process indicated by the DCI format assuming that the DCI includes a 4-bit or 3-bit HARQ process number (HPN) field, and performs the HARQ process for the downlink transport block (TB).

(Option 3)

In Option 3, the HARQ process number associated with each HARQ entity is configured by RRC.

Figure 7:
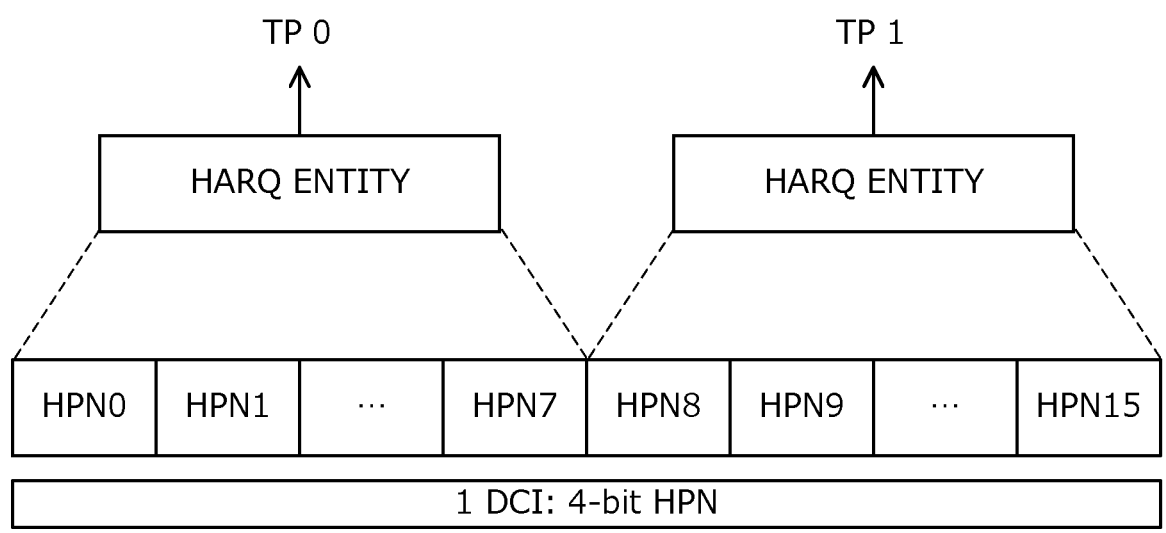
FIG. 7 is a diagram illustrating an example of the configuration of a HARQ entity and a HARQ process according to Option 3 of the second aspect.

FIG. 7 is a diagram illustrating an example of the configuration of a HARQ entity and a HARQ process according to Option 3 of the second aspect.

The example illustrated in FIG. 7 is a case of Assumption 1: scheduling of PDSCHs transmitted from a plurality of transmission points is controlled using a single downlink control channel (for example, PDCCH) or single downlink control information (DCI).

In the example illustrated in FIG. 7, a plurality of independent HARQ entities (HARQ entity 0 and HARQ entity 1) are configured by RRC for each cell. The total number of HARQ processes per cell is set to a maximum of 16 as in the related art.

For example, when PDSCHs are transmitted from up to two transmission points (for example, up to two panels or up to two transmission reception points), the RRC configures two independent HARQ entities for each cell as illustrated in FIG. 7. In this case, each HARQ entity may manage up to eight HARQ processes.

Up to 16 HARQ processes managed by a plurality of HARQ entities are supported by one DCI. That is, one DCI includes a 4-bit HARQ process number (HPN) field. By the RRC, HPN0 to HPN7 are configured as HARQ process numbers of up to eight HARQ processes managed by the HARQ entity 0. By the RRC, HPN8 to HPN15 are configured as HARQ process numbers of up to eight HARQ processes managed by the HARQ entity 1.

In the example illustrated in FIG. 7, the transmission point TP0 configures a HARQ process from up to eight HARQ processes managed by the HARQ entity 0, maps the value (one of HPN0 to HPN7) of the HARQ process number corresponding to the HARQ process to the DCI format field, and transmits the result to the user terminal. The DCI format used herein includes a 4-bit HARQ process number (HPN) field. Similarly, the transmission point TP1 configures a HARQ process from up to eight HARQ processes managed by the HARQ entity 1, maps the value (one of HPN8 to HPN15) of the HARQ process number corresponding to the HARQ process to the DCI field, and transmits the result to the user terminal.

In the example illustrated in FIG. 7, each HARQ entity supports the same number of HARQ processes. However, each HARQ entity may support a different number of HARQ processes.

In FIG. 7, the term "TP" meaning a transmission point may be read as a panel, a transmission reception point, a PDCCH control resource set (CORESET), a search space, a PDSCH DMRS port group, a codeword, or a transport block (TB).

In Option 3, "Assumption 1" may be configured in the user terminal by higher layer signaling (for example, RRC signaling), and the number of HARQ entities per cell and information, such as the association between the HARQ entity and the transmission point, may be notified. For example, when the configuration illustrated in FIG. 7 is notified, the user terminal operates assuming that there are two independent HARQ entities for each cell, and operates assuming that one DCI includes a 4-bit HARQ process number (HPN) field.

The user terminal monitors a single downlink control channel (for example, PDCCH) or single downlink control information (for example, DCI) transmitted from each of a plurality of transmission points (TP0 and TP1 in FIG. 7). When the user terminal detects a PDCCH having a DCI transmitted from the plurality of transmission points, the user terminal decodes the corresponding PDSCH indicated by the DCI. The user terminal specifies a HARQ process indicated by the DCI format assuming that the DCI includes a 4-bit HARQ process number (HPN) field, and performs the HARQ process for the downlink transport block (TB).

The configuration in which the number of HARQ processes managed by each HARQ entity is fixed (Option 1) and the configuration in which the number of HARQ processes managed by each HARQ entity is variable (Option 2) may be switched by higher layer signaling. The configuration in which the HARQ process number associated with each HARQ entity is configured by RRC (Option 3) may be switched to Option 1 or Option 2 by higher layer signaling, or may be operated in combination.

As described above, in a scenario in which PDSCHs (for example, PDSCHs using NCJT) are transmitted from a plurality of transmission points to the user terminal, when "Assumption 1" or "Assumption 2" is configured in the user terminal, it is possible to appropriately configure and execute the HARQ process of the user terminal by configuring and designing the HARQ entity and the HARQ process as described in the first aspect or the second aspect.

(Radio Communication System)

Hereinafter, the structure of a radio communication system according to the present embodiment will be described. In this radio communication system, the radio communication method according to the embodiment described above is applied.

Figure 8:
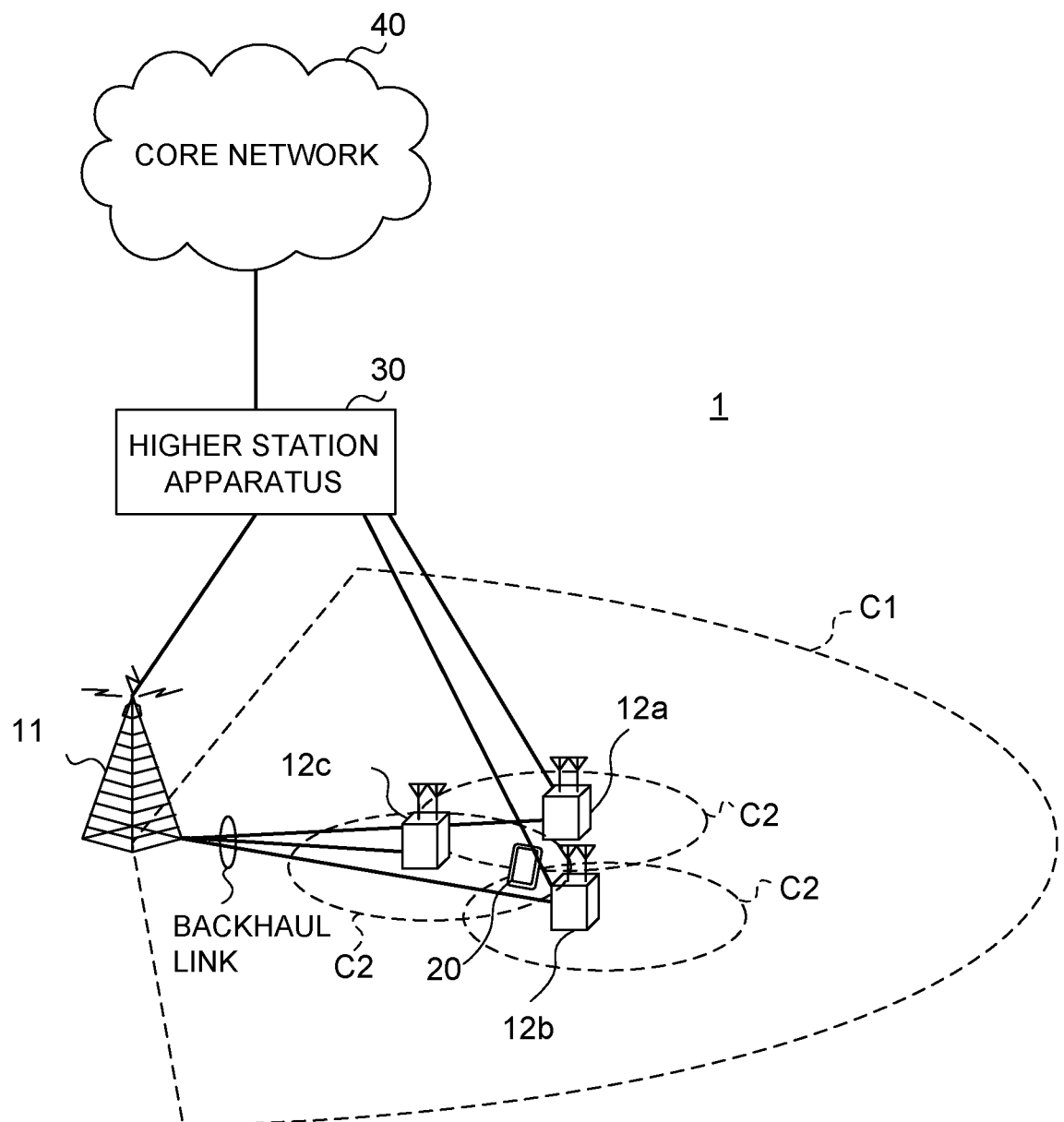
FIG. 8 is a diagram illustrating an example of a schematic structure of a radio communication system according to the present embodiment.

FIG. 8 is a diagram illustrating an example of a schematic structure of the radio communication system according to the present embodiment. In a radio communication system 1, it is possible to apply carrier aggregation (CA) or dual connectivity (DC) to group a plurality of fundamental frequency blocks (component carriers) into one, where the system bandwidth (for example, 20 MHz) of the LTE system is one unit. The radio communication system 1 may be referred to as SUPER 3G, LTE-A (LTE-Advanced), IMT-Advanced, 4G, 5G, FRA (Future Radio Access), NR (New Rat), and the like.

The radio communication system 1 illustrated in FIG. 8 includes a radio base station 11 that forms a macro cell C1 and radio base stations 12a to 12c that are placed within the macro cell C1 and that form small cells C2, which are narrower than the macro cell C1. The user terminal 20 is placed in the macro cell C1 and in each small cell C2. A configuration in which different numerologies are applied between cells may be adopted. The numerology refers to a signal design in certain RAT or a set of communication parameters that characterize the RAT design.

The user terminal 20 can be connected to both the radio base station 11 and the radio base stations 12. The user terminal 20 may use the macro cell C1 and the small cells C2, using different frequencies, at the same time by the CA or DC. The user terminal 20 may apply CA or DC using a plurality of cells (CCs) (for example, two or more CCs). The user terminal can use the licensed band CC and the unlicensed band CC as a plurality of cells. It is possible to adopt a configuration in which a TDD carrier to which the shortened TTI is applied is included in any of the plurality of cells.

Between the user terminal 20 and the radio base station 11, communication can be performed using a carrier with a narrow bandwidth in a relatively low frequency band (for example, 2 GHz) (this carrier is also referred to as "existing carrier", "Legacy carrier", or the like). Between the user terminal 20 and the radio base stations 12, a carrier with a wide bandwidth in a relatively high frequency band (for example, 3.5 GHz, 5 GHz, 30 to 70 GHz, and the like) may be used, or the same carrier as that for use between the radio base station 11 and the user terminal 20 may be used. The structure of the frequency band for use in each radio base station is by no means limited to these.

A configuration can be adopted in which wire connection (for example, an X2 interface or an optical fiber complying with CPRI (common public radio interface)) or wireless connection is made between the radio base station 11 and the radio base station 12 (or between two radio base stations 12).

Each of the radio base station 11 and the radio base stations 12 is connected to a higher station apparatus 30, and is connected to a core network 40 through the higher station apparatus 30. The higher station apparatus 30 may be, for example, an access gateway apparatus, a radio network controller (RNC), or a mobility management entity (MME), but is by no means limited to these. Each radio base station 12 may be connected to the higher station apparatus 30 through the radio base station 11.

The radio base station 11 is a radio base station having a relatively wide coverage, and may be referred to as a "macro base station", an "aggregate node", an "eNB (eNodeB)", a "transmission reception point", and the like. The radio base station 12 is a radio base station having a local coverage, and may be referred to as a small base station, a micro base station, a pico base station, a femto base station, an HeNB (Home eNodeB), an RRH (Remote Radio Head), a transmission reception point, and the like. Hereinafter, the radio base stations 11 and 12 will be collectively referred to as a "radio base station 10", unless otherwise specified.

Each user terminal 20 is a terminal that supports various communication methods such as LTE and LTE-A, and may include not only a mobile communication terminal but also a stationary communication terminal.

In the radio communication system 1, as radio access schemes, OFDMA (Orthogonal Frequency Division Multiple Access) can be applied to the downlink (DL), and SC-FDMA (Single Carrier-Frequency Division Multiple Access) can be applied to the uplink (UL). The OFDMA is a multi-carrier communication scheme to perform communication by dividing a frequency band into a plurality of narrow frequency bands (subcarriers) and mapping data to each subcarrier. The SC-FDMA is a single-carrier communication scheme to reduce interference between terminals by dividing the system bandwidth into bands including one or consecutive resource blocks for each terminal so that a plurality of terminals use different bands. The uplink and downlink radio access schemes are not limited to the combinations of these, and the OFDMA may be used in UL.

In the radio communication system 1, a downlink data channel (PDSCH (Physical Downlink Shared Channel), which is also referred to as a downlink shared channel, and the like), which is shared by the user terminals 20, a broadcast channel (PBCH (Physical Broadcast Channel)), L1/L2 control channels, and the like are used as a DL channel. User data, higher layer control information, system information blocks (SIBs), and the like are transmitted by the PDSCH. The MIB (Master Information Block) is transmitted by the PBCH.

The L1/L2 control channels include downlink control channels (physical downlink control channel (PDCCH) and enhanced physical downlink control channel (EPDCCH)), a physical control format indicator channel (PCFICH), a physical hybrid-ARQ indicator channel (PHICH), and the like. Downlink control information (DCI) including PDSCH and PUSCH scheduling information and the like are transmitted by the PDCCH. The number of OFDM symbols used for the PDCCH is transmitted by the PCFICH. Delivery acknowledgment information (ACK/NACK) of HARQ with respect to the PUSCH is transmitted by the PHICH. The EPDCCH is frequency-division-multiplexed with the PDSCH (downlink shared data channel) and used to transmit the DCI and the like, similarly to the PDCCH.

In the radio communication system 1, an uplink data channel (PUSCH (Physical Uplink Shared Channel), which is also referred to as an uplink shared channel and the like), which is shared by the user terminals 20, an uplink control channel (PUCCH (Physical Uplink Control Channel)), a random access channel (PRACH (Physical Random Access Channel)), and the like are used as UL channels. User data or higher layer control information are transmitted by the PUSCH. Uplink control information (UCI) including at least one of delivery acknowledgment information (ACK/NACK) and radio quality information (CQI) is transmitted by the PUSCH or the PUCCH. By the PRACH, random access preambles for establishing connections with cells are transmitted.

<Radio Base Station>

Figure 9:
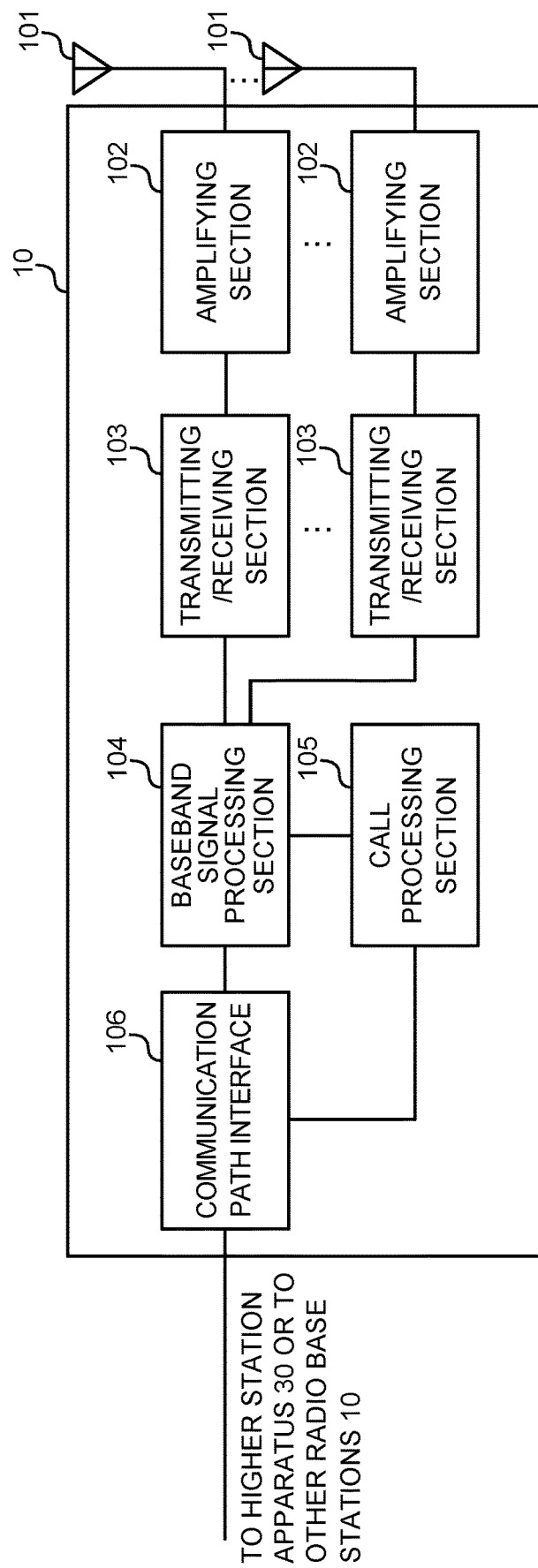
FIG. 9 is a diagram illustrating an example of a functional structure of the radio base station according to the present embodiment.

FIG. 9 is a diagram illustrating an example of an overall structure of the radio base station according to the present embodiment. The radio base station 10 includes a plurality of transmitting/receiving antennas 101, amplifying sections 102, transmitting/receiving sections 103, a baseband signal processing section 104, a call processing section 105 and a communication path interface 106. One or more transmitting/receiving antennas 101, one or more amplifying sections 102, and one or more transmitting/receiving sections 103 may be provided. The radio base station 10 is downlink data transmitting apparatus and may be uplink data receiving apparatus.

Downlink data to be transmitted from the radio base station 10 to the user terminal 20 is input from the higher station apparatus 30 to the baseband signal processing section 104 through the communication path interface 106.

In the baseband signal processing section 104, downlink data is subjected to transmission processes, including a PDCP (Packet Data Convergence Protocol) layer process, division and coupling of user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to the transmitting/receiving section 103. The downlink control signal is also subjected to transmission processes such as channel coding and inverse fast Fourier transform, and is forwarded to the transmitting/receiving sections 103.

The transmitting/receiving section 103 converts a baseband signal, which is pre-coded for each antenna and output from the baseband signal processing section 104, into a signal in a radio frequency band, and transmits such a radio frequency signal. The radio frequency signal subjected to frequency conversion by the transmitting/receiving sections 103 is amplified by the amplifying section 102 and transmitted from the transmitting/receiving antenna 101. The transmitting/receiving section 103 can be a transmitter/receiver, a transmitting/receiving circuit, or a transmitting/receiving apparatus described based on the common recognition in the technical field of the present invention. The transmitting/receiving section 103 may be configured as an integrated transmitting/receiving section, or may be configured as a transmitting section and a receiving section.

As for the uplink signal, a radio frequency signal received by the transmitting/receiving antenna 101 is amplified by the amplifying sections 102. The transmitting/receiving section 103 receives the uplink signal amplified by the amplifying section 102. The transmitting/receiving section 103 frequency-converts the received signal into a baseband signal, and outputs the baseband signal to the baseband signal processing section 104.

In the baseband signal processing section 104, user data included in the input uplink signal is subjected to a fast Fourier transform (FFT) process, an inverse discrete Fourier transform (IDFT) process, error correction decoding, a MAC retransmission control receiving process, and RLC layer and PDCP layer receiving processes, and the result is forwarded to the higher station apparatus 30 through the communication path interface 106. The call processing section 105 performs call processes, such as configuring and releasing of communication channels, manages the state of the radio base stations 10, and manages radio resources.

The communication path interface 106 transmits and receives signals to and from the higher station apparatus 30 through a predetermined interface. The communication path interface 106 may transmit and receive signals (backhaul signaling) to and from another radio base station 10 through an inter-base station interface (for example, an X2 interface or an optical fiber complying with CPRI (Common Public Radio Interface)).

The transmitting/receiving section 103 may further include an analog beam forming section that performs analog beam forming. The analog beam forming section can be an analog beam forming circuit (for example, a phase shifter, a phase shift circuit) or an analog beam forming apparatus (for example, a phase shifter) described based on the common recognition in the technical field of the present invention. The transmitting/receiving antenna 101 can be an array antenna, for example. The transmitting/receiving section 103 is configured such that single BF and multi BF can be applied.

The transmitting/receiving section 103 may transmit a signal using a transmission beam and may receive a signal using a reception beam. The transmitting/receiving section 103 may transmit and receive a signal using a predetermined beam determined by the control section 301.

The transmitting/receiving section 103 transmits downlink signals (for example, downlink control signals (downlink control channels), downlink data signals (downlink data channels, downlink shared channels), downlink reference signals (DM-RS, CSI-RS, and the like), discovery signals, synchronization signals, broadcast signals, and the like). The transmitting/receiving section 103 receives uplink signals (for example, uplink control signals (uplink control channels), uplink data signals (uplink data channels, uplink shared channels), uplink reference signals, and the like).

The transmitting/receiving section 103 transmits one or more pieces of downlink control information used for scheduling of downlink shared channels transmitted from a plurality of transmission points. A HARQ process number managed by one or more independent HARQ entities for each cell is mapped with the HARQ process number (HPN) field included in the downlink control information.

The transmitting section and the receiving section of the present invention are both the transmitting/receiving section 103 and the communication path interface 106 or either one of these.

Figure 10:
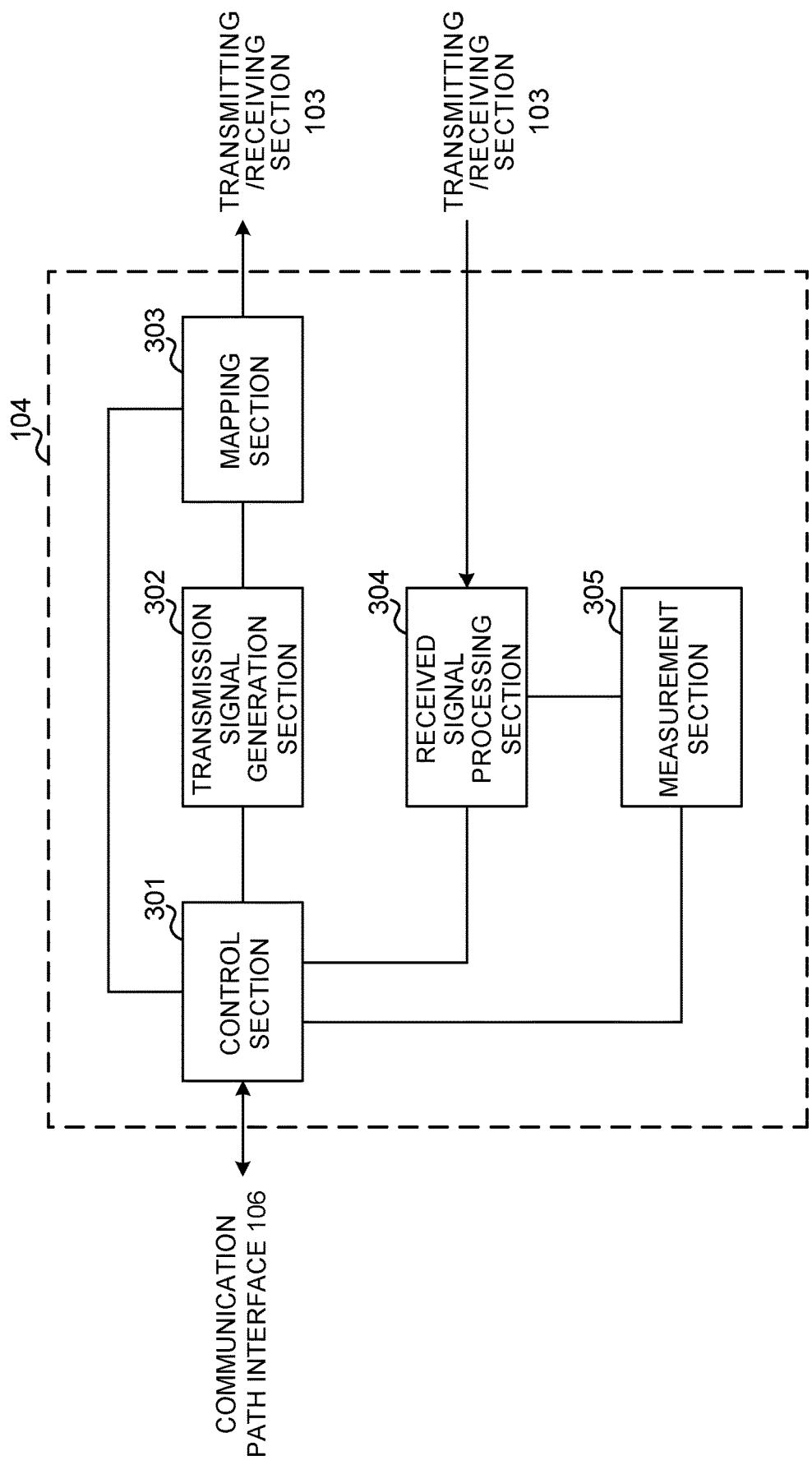
FIG. 10 is a diagram illustrating an example of a functional structure of a baseband signal processing section of the radio base station.

FIG. 10 is a diagram illustrating an example of a functional structure of the radio base station according to the present embodiment. In addition, FIG. 10 mainly illustrates the functional blocks of the characteristic part in the present embodiment, and it is assumed that the radio base station 10 also has other functional blocks necessary for radio communication. As illustrated in FIG. 10, the baseband signal processing section 104 includes at least a control section 301, a transmission signal generation section 302, a mapping section 303, a received signal processing section 304, and a measurement section 305.

The control section 301 performs overall control of the radio base station 10. The control section 301 can be a controller, a control circuit, or a control apparatus described based on the common recognition in the technical field of the present invention.

The control section 301 controls, for example, the generation of signals by the transmission signal generation section 302 or the allocation of signals by the mapping section 303. The control section 301 controls the signal receiving process of the received signal processing section 304 or the signal measurement of the measurement section 305.

The control section 301 controls scheduling (for example, resource allocation) of downlink signals and uplink signals. Specifically, the control section 301 controls the transmission signal generation section 302, the mapping section 303, and the transmitting/receiving section 103 so as to generate and transmit DCI (DL assignment, DL grant) including scheduling information of downlink data channels and DCI (UL grant) including scheduling information of uplink data channels.

The control section 301 may control transmission or reception of control information and data in multi-slot aggregation and preemption.

The transmission signal generation section 302 generates downlink signals (downlink control channels, downlink data channels, downlink reference signals such as DM-RS, and the like) based on commands from the control section 301, and outputs the signals to the mapping section 303. The transmission signal generation section 302 can be a signal generator, a signal generating circuit, or a signal generation apparatus described based on the common recognition in the technical field of the present invention.

The mapping section 303 maps the downlink signals generated by the transmission signal generation section 302 to predetermined radio resources based on commands from the control section 301, and outputs these to the transmitting/receiving sections 103. The mapping section 303 can be a mapper, a mapping circuit, or a mapping apparatus described based on the common recognition in the technical field of the present invention.

The received signal processing section 304 performs receiving processes (for example, demapping, demodulation, decoding, and the like) on received signals that are input from the transmitting/receiving sections 103. For example, the received signals are uplink signals (uplink control channels, uplink data channels, uplink reference signals, and the like) transmitted from the user terminals 20. The received signal processing section 304 can be a signal processor, a signal processing circuit, or a signal processing apparatus described based on the common recognition in the technical field of the present invention.

The received signal processing section 304 outputs the information decoded by the receiving process to the control section 301. For example, the receiving processing section 304 outputs at least one of the preamble, the control information, and the UL data to the control section 301. In addition, the received signal processing section 304 outputs the received signal and the signal after the receiving process to the measurement section 305.

The measurement section 305 performs measurement on the received signal. The measurement section 305 can be a measurer, a measurement circuit, or a measurement apparatus described based on the common knowledge in the technical field of the present invention.

The measurement section 305 may measure, for example, the received power (for example, RSRP (Reference Signal Received Power)) of the received signal, the reception quality (for example, RSRQ (Reference Signal Received Quality)), the channel state, and the like. The measurement results may be output to the control section 301.

(User Terminal)

Figure 11:
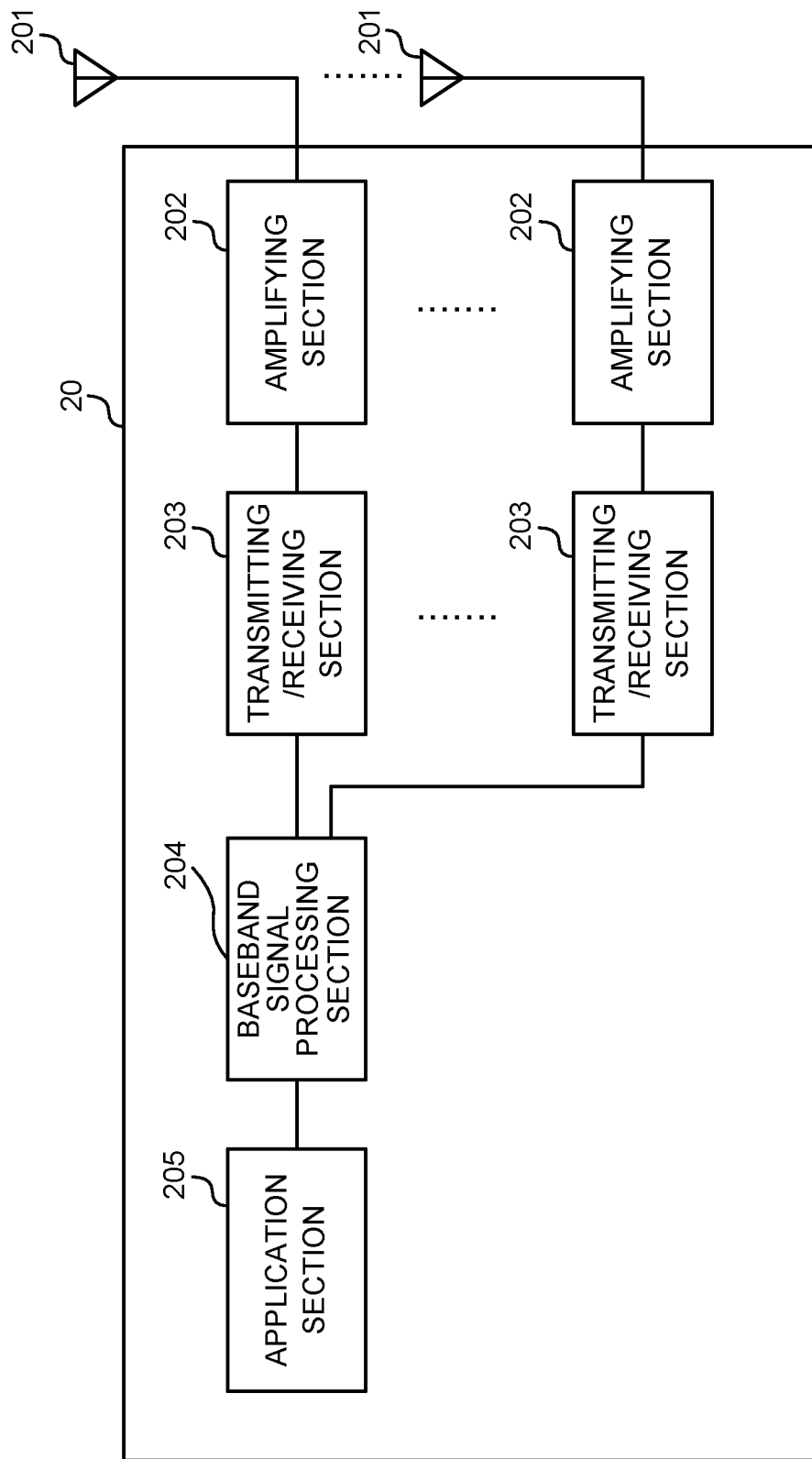
FIG. 11 is a diagram illustrating an example of a functional structure of the user terminal according to the present embodiment.

FIG. 11 is a diagram illustrating an example of an overall structure of the user terminal according to the present embodiment. The user terminal 20 has a plurality of transmitting/receiving antennas 201, an amplifying section 202, a transmitting/receiving section 203, a baseband signal processing section 204, and an application section 205. One or more transmitting/receiving antennas 201, one or more amplifying sections 202, and one or more transmitting/receiving sections 203 may be provided. The user terminal 20 is a downlink data receiving apparatus, and may be an uplink data transmitting apparatus.

Radio frequency signals that are received in the transmitting/receiving antennas 201 are amplified in the amplifying sections 202. The transmitting/receiving section 203 receives the downlink signal amplified in the amplifying section 202. The received signals are subjected to frequency conversion and converted into the baseband signal in the transmitting/receiving sections 203, and output to the baseband signal processing section 204. The transmitting/receiving section 203 can be a transmitter/receiver, a transmitting/receiving circuit, or a transmitting/receiving apparatus described based on the common recognition in the technical field of the present invention. The transmitting/receiving section 203 may be configured as an integrated transmitting/receiving section, or may be configured as a transmitting section and a receiving section.

The baseband signal processing section 204 performs an FFT process, error correction decoding, a retransmission control receiving process, and the like on the input baseband signal. The downlink data is forwarded to the application section 205. The application section 205 performs processes related to higher layers than a physical layer and a MAC layer, and the like. The system information and the higher layer control information in the downlink data are also forwarded to the application section 205.

Uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process, and the like, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving section 203 may further include an analog beam forming section that performs analog beam forming. The analog beam forming section can be an analog beam forming circuit (for example, a phase shifter, a phase shift circuit) or an analog beam forming apparatus (for example, a phase shifter) described based on the common recognition in the technical field of the present invention. The transmitting/receiving antenna 201 can be an array antenna, for example. The transmitting/receiving section 203 is configured such that single BF and multi BF can be applied.

The transmitting/receiving section 203 may transmit a signal using a transmission beam and may receive a signal using a reception beam. The transmitting/receiving section 203 may transmit and receive a signal using a predetermined beam determined by the control section 401.

The transmitting/receiving section 203 receives downlink signals (for example, downlink control signals (downlink control channels), downlink data signals (downlink data channels, downlink shared channels), downlink reference signals (DM-RS, CSI-RS, and the like), discovery signals, synchronization signals, broadcast signals, and the like). The transmitting/receiving section 203 transmits uplink signals (for example, uplink control signals (uplink control channels), uplink data signals (uplink data channels, uplink shared channels), uplink reference signals, and the like).

The transmitting/receiving section 203 receives one or more pieces of downlink control information used for scheduling of downlink shared channels transmitted from a plurality of transmission points. A HARQ process number managed by one or more independent HARQ entities for each cell is mapped with the HARQ process number (HPN) field included in the downlink control information. The transmitting/receiving section 203 transmits HARQ-ACK information corresponding to the HARQ process number.

Figure 12:
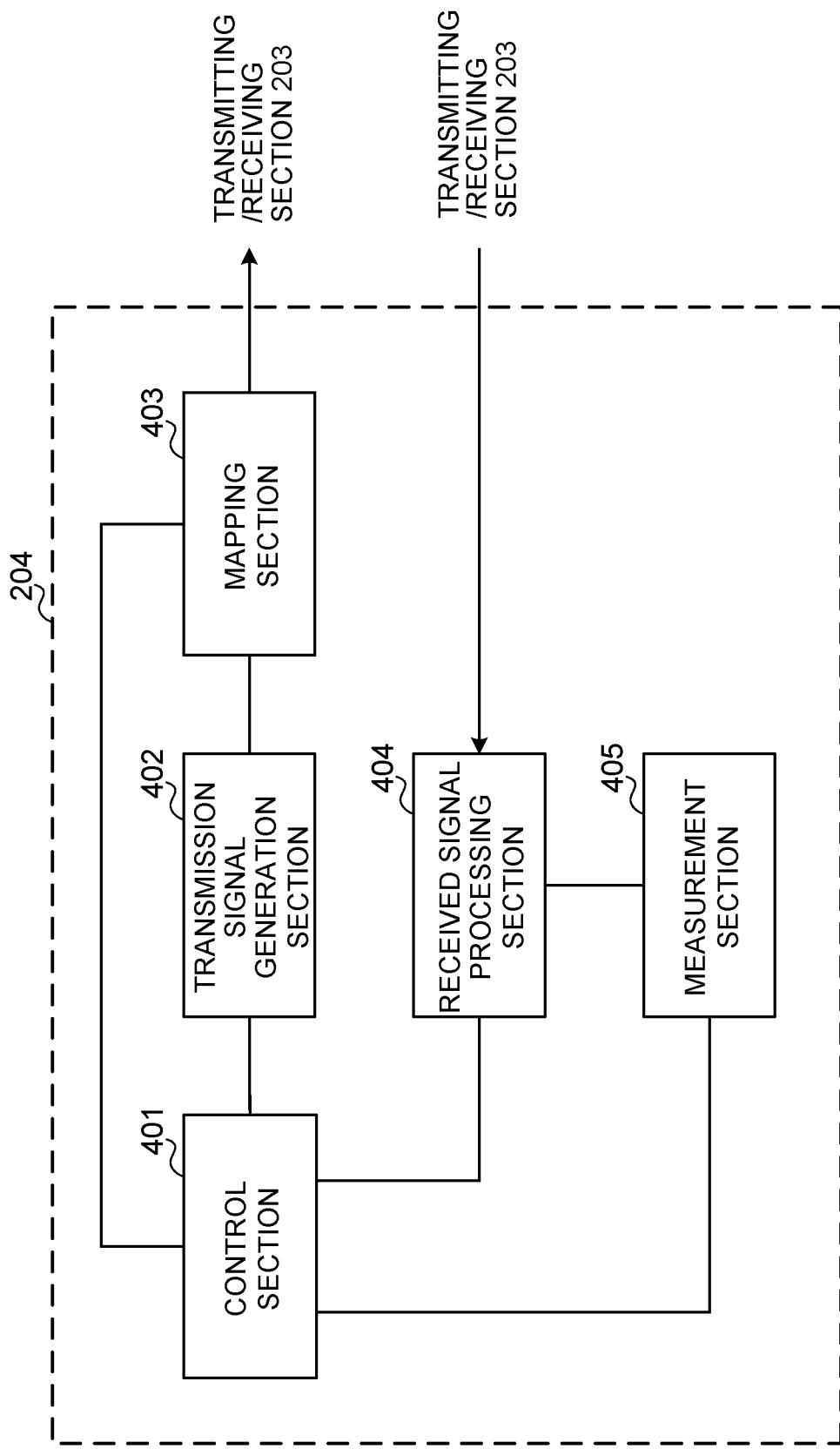
FIG. 12 is a diagram illustrating an example of a functional structure of a baseband signal processing section of the user terminal.

FIG. 12 is a diagram illustrating an example of a functional structure of the user terminal according to the present embodiment. FIG. 12 mainly illustrates functional blocks of characteristic portions in the present embodiment, and it is assumed that the user terminal 20 has other functional blocks necessary for radio communication as well. As illustrated in FIG. 12, the baseband signal processing section 204 provided in the user terminal 20 at least includes a control section 401, a transmission signal generation section 402, a mapping section 403, a received signal processing section 404 and a measurement section 405.

The control section 401 performs overall control of the user terminal 20. The control section 401 can be a controller, a control circuit, or a control apparatus described based on the common recognition in the technical field of the present invention.

The control section 401 controls, for example, the generation of signals by the transmission signal generation section 402 or the allocation of signals by the mapping section 403. The control section 401 controls the signal receiving process of the received signal processing section 404 or the signal measurement of the measurement section 405.

The control section 401 may detect a HARQ process number indicated by the HARQ process number (HPN) field included in the downlink control information and perform control so as to transmit HARQ-ACK information corresponding to the HARQ process number.

The transmission signal generation section 402 generates uplink signals (uplink control channels, uplink data channels, uplink reference signals, and the like) based on commands from the control section 401, and outputs these signals to the mapping section 403. The transmission signal generation section 402 can be a signal generator, a signal generating circuit, or a signal generation apparatus described based on the common recognition in the technical field of the present invention.

The transmission signal generation section 402 generates uplink data channels based on commands from the control section 401. For example, when a UL grant is included in a downlink control channel that is reported from the radio base station 10, the control section 401 commands the transmission signal generation section 402 to generate an uplink data channel.

The mapping section 403 maps the uplink signals generated in the transmission signal generation section 402 to radio resources based on commands from the control section 401, and output the result to the transmitting/receiving section 203. The mapping section 403 can be a mapper, a mapping circuit, or a mapping apparatus described based on the common recognition in the technical field of the present invention.

The received signal processing section 404 performs receiving processes (for example, demapping, demodulation, decoding, and the like) on received signals that are input from the transmitting/receiving sections 203. For example, the received signals include downlink signals (downlink control channels, downlink data channels, downlink reference signals, and the like) that are transmitted from the radio base station 10. The received signal processing section 404 can be a signal processor, a signal processing circuit, or a signal processing apparatus described based on the common recognition in the technical field of the present invention. The received signal processing section 404 can constitute the receiving section according to the present invention.

The received signal processing section 404 blind-decodes the downlink control channels that schedule the transmission and reception of the downlink data channels based on commands from the control section 401, and performs the receiving processes of the downlink data channels based on the DCI. The received signal processing section 404 estimates the channel gain based on DM-RS or CRS, and demodulates the downlink data channels based on the estimated channel gain.

The received signal processing section 404 output the decoded information that is acquired through the receiving processes to the control section 401. The received signal processing section 404 outputs, for example, broadcast information, system information, RRC signaling, DCI, and the like, to the control section 401. The received signal processing section 404 may output the data decoding result to the control section 401. The received signal processing section 404 outputs the received signals or the signals after the receiving processes to the measurement section 405.

The measurement section 405 conducts measurements with respect to the received signals. The measurement section 405 can be a measurer, a measurement circuit, or a measurement apparatus described based on the common knowledge in the technical field of the present invention.

The measurement section 405 may measure, for example, the received power (for example, RSRP) of the received signal, the DL reception quality (for example, RSRQ), the channel state, and the like. The measurement results may be output to the control section 401.

(Hardware Configuration)

The block diagrams that have been used to describe the above embodiments show blocks in functional units. These functional blocks (components) may be implemented in arbitrary combinations of at least one of hardware and software. The method for implementing each functional block is not particularly limited. That is, each functional block may be achieved by a single apparatus physically or logically aggregated, or may be achieved by directly or indirectly connecting two or more physically or logically separate apparatuses (using wires, radio, or the like, for example) and using these plural apparatuses. Each functional block may be implemented by combining the above-described one apparatus or the above-described plurality of apparatuses with software.

Here, functions include determining, judging, calculating, computing, processing, deriving, investigating, searching, ascertaining, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, and the like, but are not limited thereto. For example, a functional block (component) that makes the transmission work may be referred to as a transmitting unit or a transmitter. In any case, as described above, the implementation method is not particularly limited.

Figure 13:
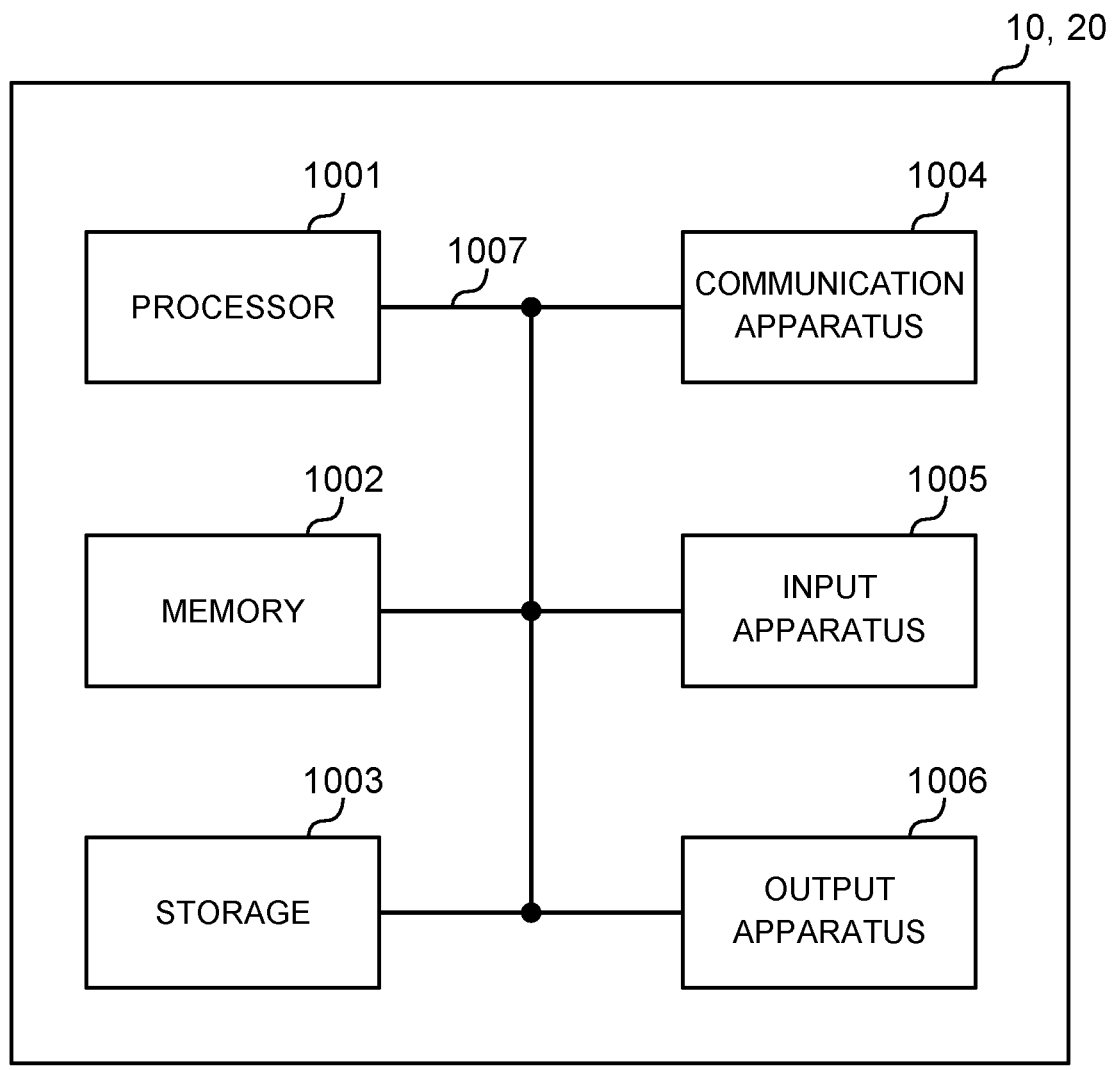
FIG. 13 is a diagram illustrating an example of a hardware structure of the radio base station and the user terminal according to the embodiment of the present invention.

For example, the base station, user terminals, and the like according to embodiments of the present disclosure may function as a computer that executes the processes of the radio communication method of the present disclosure. FIG. 13 is a diagram illustrating an example of a hardware structure of the base station and the user terminal according to the embodiment. Physically, the above-described base stations 10 and user terminals 20 may be formed as a computer apparatus that includes a processor 1001, a memory 1002, a storage 1003, communication apparatus 1004, input apparatus 1005, output apparatus 1006 and a bus 1007.

In the following description, the term "apparatus" may be replaced by "circuit", "device", "unit", and the like. The hardware structure of a base station 10 and a user terminal 20 may be designed to include one or more of each apparatus illustrated in the drawings, or may be designed not to include part of the apparatus.

For example, although only one processor 1001 is illustrated, a plurality of processors may be provided. Processes may be implemented with one processor, or processes may be implemented simultaneously, in sequence, or in different manners, on two or more processors. The processor 1001 may be implemented with one or more chips.

Each function of the base station 10 and the user terminal 20 is implemented by reading predetermined software (program) on hardware such as the processor 1001 and the memory 1002, and by controlling the calculations in the processor 1001, the communication in the communication apparatus 1004, and at least one of the reading and writing of data in the memory 1002 and the storage 1003.

The processor 1001 may control the whole computer by, for example, running an operating system. The processor 1001 may be configured with a central processing unit (CPU), which includes interfaces with peripheral equipment, control apparatus, computing apparatus, a register, and the like. For example, the above-described baseband signal processing section 104 (204), call processing section 105, and the like may be implemented by the processor 1001.

The processor 1001 reads programs (program codes), software modules, or data, from at least one of the storage 1003 and the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register", a "cache", a "main memory (primary storage apparatus)" and the like. The memory 1002 can store a program (program code), a software module, and the like, which are executable for implementing the radio communication method according to the embodiment of the present disclosure.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and the like), a digital versatile disc, a Blu-ray (registered trademark) disk), a removable disc, a hard disk drive, a smart card, a flash memory device (for example, a card, a stick, a key drive, and the like), a magnetic stripe, a database, a server, and/or other appropriate storage media. The storage 1003 may be referred to as "secondary storage apparatus".

The communication apparatus 1004 is hardware (transmitting/receiving device) for performing inter-computer communication via at least one of a wired network and a wireless network, and for example, is referred to as "network device", "network controller", "network card", "communication module", and the like. The communication apparatus 1004 may be configured to include a high frequency switch, a duplexer, a filter, a frequency synthesizer, and the like in order to implement, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106, and the like may be implemented by the communication apparatus 1004. The transmitting/receiving section 103 may be implemented so as to be physically or logically separated from a transmitting section 103a and a receiving section 103b.

The input apparatus 1005 is an input device for receiving input from the outside (for example, a keyboard, a mouse, a microphone, a switch, a button, a sensor, and the like). The output apparatus 1006 is an output device for allowing sending output to the outside (for example, a display, a speaker, an LED (Light Emitting Diode) lamp, and the like). The input apparatus 1005 and the output apparatus 1006 may be provided in an integrated structure (for example, a touch panel).

These pieces of apparatus, including the processor 1001, the memory 1002, and the like are connected by the bus 1007 so as to communicate information. The bus 1007 may be formed with a single bus, or may be formed with buses that vary between pieces of apparatus.

The base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array), and the like, and part or all of the functional blocks may be implemented by the hardware. For example, the processor 1001 may be implemented with at least one of these pieces of hardware.

(Variations)

The terminology described in the present disclosure and the terminology that is needed to understand the present disclosure may be replaced with other terms that convey the same or similar meanings. For example, at least one of "channels" and "symbols" may be replaced by "signals" (or "signaling"). "Signals" may be "messages". A reference signal may be abbreviated as an RS, and may be referred to as a pilot, a pilot signal, and the like, depending on which standard applies. A "component carrier (CC)" may be referred to as a "cell", a "frequency carrier", a "carrier frequency", and the like.

A radio frame may be composed of one or more periods (frames) in the time domain. Each of one or more periods (frames) constituting a radio frame may be referred to as a "subframe". Furthermore, a subframe may be composed of one or multiple slots in the time domain. A subframe may be a fixed time duration (for example, 1 ms) that is not dependent on numerology.

Here, the numerology may be a communication parameter used for at least one of transmission and reception of a certain signal or channel. For example, the numerology may indicate at least one of SubCarrier Spacing (SCS), a bandwidth, a symbol length, a cyclic prefix length, a transmission time interval (TTI), the number of symbols per TTI, a radio frame structure, a specific filtering process to be performed by a transceiver in the frequency domain, a specific windowing process to be performed by a transceiver in the time domain and the like.

A slot may be composed of one or more symbols in the time domain (OFDM (Orthogonal Frequency Division Multiplexing) symbols, SC-FDMA (Single Carrier Frequency Division Multiple Access) symbols, and the like). A slot may be a time unit based on numerology.

A slot may include a plurality of minislots. Each minislot may be composed of one or more symbols in the time domain. A minislot may be referred to as a "subslot". Each minislot may be composed of fewer symbols than a slot. A PDSCH (or PUSCH) transmitted in a time unit larger than a minislot may be referred to as PDSCH (PUSCH) mapping type A. A PDSCH (or PUSCH) transmitted using a minislot may be referred to as "PDSCH (PUSCH) mapping type B".

A radio frame, a subframe, a slot, a minislot and a symbol all represent the time unit in signal communication. A radio frame, a subframe, a slot, a minislot and a symbol may be each called by other applicable names.

For example, one subframe may be referred to as a "transmission time interval (TTI)", or a plurality of consecutive subframes may be referred to as a "TTI", or one slot or minislot may be referred to as a "TTI". That is, at least one of a subframe and a TTI may be a subframe (1 ms) in the existing LTE, may be a shorter period than 1 ms (for example, one to thirteen symbols), or may be a longer period of time than 1 ms. The unit to represent the TTI may be referred to as a "slot", a "mini slot", and the like, instead of a "subframe".

Here, a TTI refers to the minimum time unit of scheduling in radio communication, for example. For example, in LTE systems, a base station schedules the radio resources (such as the frequency bandwidth and transmission power that can be used in each user terminal) to allocate to each user terminal in TTI units. The definition of TTIs is not limited to this.

The TTI may be the transmission time unit of channel-encoded data packets (transport blocks), code blocks, codewords, and the like, or may be the unit of processing in scheduling, link adaptation, and the like. When TTI is given, a time interval (for example, the number of symbols) in which the transport blocks, the code blocks, the codewords, and the like are actually mapped may be shorter than TTI.

When one slot or one minislot is referred to as a "TTI", one or more TTIs (that is, one or multiple slots or one or more minislots) may be the minimum time unit of scheduling. The number of slots (the number of minislots) to constitute this minimum time unit of scheduling may be controlled.

A TTI having a time duration of 1 ms may be referred to as a normal TTI (TTI in LTE Rel. 8-12), a long TTI, a normal subframe, a long subframe, a slot, and the like. A TTI that is shorter than the normal TTI may be referred to as a shortened TTI, a short TTI, a partial TTI (partial or fractional TTI), a shortened subframe, a short subframe, a minislot, a subslot, a slot, and the like.

A long TTI (for example, a normal TTI or a subframe) may be read as a TTI having a time duration exceeding 1 ms, and a short TTI (for example, a shortened TTI) may be read as a TTI shorter than the TTI length of the long TTI and equal to or longer than 1 ms.

A resource block (RB) is the unit of resource allocation in the time domain and the frequency domain, and may include one or a plurality of consecutive subcarriers in the frequency domain.

An RB may include one or more symbols in the time domain, and may be one slot, one minislot, one subframe or one TTI in length. One TTI and one subframe each may be composed of one or more resource blocks.

One or more RBs may be referred to as a "physical resource block (PRB (Physical RB))", a "subcarrier group (SCG)", a "resource element group (REG)", a "PRB pair", an "RB pair", and the like.

A resource block may be composed of one or more resource elements (REs). For example, one RE may be a radio resource field of one subcarrier and one symbol.

The structures of radio frames, subframes, slots, minislots, symbols, and the like described above are merely examples. For example, configurations pertaining to the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the symbol duration, the length of cyclic prefixes (CPs), and the like can be variously changed.

The information and parameters described in the present disclosure may be represented in absolute values or in relative values with respect to predetermined values, or may be represented using other applicable information. For example, a radio resource may be specified by a predetermined index.

The names used for parameters and the like in the present disclosure are in no respect limiting. In addition, an equation and the like using these parameters may differ from those explicitly disclosed in the present disclosure. Since various channels (PUCCH (Physical Uplink Control Channel), PDCCH (Physical Downlink Control Channel) and the like) and information elements can be identified by any suitable names, the various names assigned to these individual channels and information elements are in no respect limiting.

The information, signals and/or others described in the present disclosure may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Information, signals and the like can be output in at least one of a direction from higher layers to lower layers and a direction from lower layers to higher layers. Information, signals and the like may be input and output via a plurality of network nodes.

The information, signals and the like that are input and/or output may be stored in a specific location (for example, in a memory), or may be managed in a control table. The information, signals and the like to be input and/or output can be overwritten, updated or appended. The information, signals and the like that are output may be deleted. The information, signals and the like that are input may be transmitted to other pieces of apparatus.

The reporting of information is by no means limited to the aspects/embodiments described in the present disclosure, and may be performed using other methods. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and the like), MAC (Medium Access Control) signaling and the like), and other signals and/or combinations of these.

Physical layer signaling may be referred to as "L1/L2 (Layer 1/Layer 2) control information (L1/L2 control signals)", "L1 control information (L1 control signal)" and the like. RRC signaling may be referred to as "RRC messages", and can be, for example, an RRC connection setup message, RRC connection reconfiguration message, and the like. MAC signaling may be reported using, for example, MAC control elements (MAC CEs (Control Elements)).

Reporting of predetermined information (for example, reporting of information to the effect that "X holds") does not necessarily have to be sent explicitly, and can be sent implicitly (for example, by not reporting this piece of information, by reporting another piece of information, and the like).

Decisions may be made in values represented by one bit (0 or 1), may be made in Boolean values that represent true or false, or may be made by comparing numerical values (for example, comparison against a predetermined value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and the like.

Software, commands, information and the like may be transmitted and received via communication media. For example, when software is transmitted from a website, a server or other remote sources by using at least one of wired technologies (coaxial cables, optical fiber cables, twisted-pair cables, digital subscriber lines (DSLs), and the like) and wireless technologies (infrared radiation, microwaves, and the like), at least one of these wired technologies and wireless technologies are also included in the definition of communication media.

The terms "system" and "network" as used in the present disclosure are used interchangeably.

In the present disclosure, the terms such as "precoding", "precoder", "weight (precoding weight)", "Quasi-Co-Location (QCL)", "transmission power", "phase rotation", "antenna port", "antenna port group", "layer", "number of layers", "rank", "beam", "beam width", "beam angle", "antenna", "antenna element", and "panel", can be used interchangeably.

In the present disclosure, the terms such as "base station (BS: Base Station)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and "bandwidth part (BWP)", may be used interchangeably. The base station may be called a term such as a macro cell, a small cell, a femto cell, a pico cell, and the like.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to all or part of the coverage area of at least one of a base station and a base station subsystem that provides communication services within this coverage.

In the present disclosure, the terms "mobile station (MS)", "user terminal", "user equipment (UE)", "terminal", and the like may be used interchangeably.

A mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of a base station and a mobile station may be referred to as transmitting apparatus, receiving apparatus, a communication apparatus, and the like. At least one of the base station and the mobile station may be a device mounted on a mobile unit, a mobile unit itself, or the like. The mobile unit may be a vehicle (such as a car, an airplane, for example), an unmanned mobile unit (such as a drone, an autonomous vehicle, for example), or a robot (manned or unmanned). At least one of the base station and the mobile station also includes a device that does not necessarily move during a communication operation. For example, at least one of the base station and the mobile station may be an IoT (Internet of Things) apparatus, such as a sensor.

The base stations in the present disclosure may be interpreted as user terminals. For example, each aspect/embodiment of the present disclosure may be applied to a configuration in which communication between a base station and a user terminal is replaced by communication among a plurality of user terminals (which may be referred to as, for example, D2D (Device-to-Device), V2X (Vehicle-to-Everything) and the like). In this case, user terminals 20 may have the functions of the base stations 10 described above. The wording such as "up" and "down" may be replaced with the wording corresponding to the terminal-to-terminal communication (for example, "side"). For example, an uplink channel and a downlink channel may be interpreted as a side channel.

Likewise, the user terminals in the present disclosure may be interpreted as base stations. In this case, the base stations 10 may have the functions of the user terminals 20 described above.

Certain actions that have been described in the present disclosure to be performed by base stations may, in some cases, be performed by their upper nodes. In a network composed of one or more network nodes with base stations, it is clear that various operations that are performed so as to communicate with terminals can be performed by base stations, one or more network nodes (for example, MMEs (Mobility Management Entities), S-GWs (Serving-Gateways) and the like may be possible, but these are not limiting) other than base stations, or combinations of these.

The aspects/embodiments illustrated in the present disclosure may be used individually or in combinations, which may be switched depending on the mode of implementation. The order of processes, sequences, flowcharts and the like that have been used to describe the aspects/embodiments in the present disclosure may be re-ordered as long as inconsistencies do not arise. For example, although various methods have been illustrated in the present disclosure with various components of steps using exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next generation systems that are enhanced based on these. Further, a plurality of systems may be combined and applied (for example, a combination of LTE or LTE-A and 5G).

The phrase "based on" as used in the present disclosure does not mean "based only on", unless otherwise specified. In other words, the phrase "based on" means both "based only on" and "based at least on".

Reference to elements with designations such as "first", "second" and the like as used in the present disclosure does not generally limit the number/quantity or order of these elements. These designations are used in the present disclosure only for convenience, as a method for distinguishing between two or more elements. In this way, reference to the first and second elements does not imply that only two elements may be employed, or that the first element must precede the second element in some way.

The term "determining" as used in the present disclosure may encompass a wide variety of actions. For example, "determining" may be regarded as judging, calculating, computing, processing, deriving, investigating, looking up, search, inquiry (for example, looking up in a table, database, or another data structure), ascertaining, and the like.

"Determining" as used herein may be interpreted to mean making judgements and determinations related to receiving (for example, receiving information), transmitting (for example, transmitting information), inputting, outputting, accessing (for example, accessing data in a memory) and the like.

"Determining" as used herein may be interpreted to mean making judgements and determinations related to resolving, selecting, choosing, establishing, comparing, and the like. In other words, to "judge" and "determine" as used herein may be interpreted to mean making judgements and determinations related to some action.

"Determining" as used herein may be interpreted to mean "assuming", "expecting", "considering" and the like.

The term "maximum transmission power" described in the present disclosure may mean the maximum value of transmission power, the nominal UE maximum transmit power, or the rated UE maximum transmit power.

As used in the present disclosure, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced by "access".

As used in the present disclosure, when two elements are connected, these elements may be considered "connected" or "coupled" to each other by using one or more electrical wires, cables, printed electrical connections, and the like, and, as some non-limiting and non-inclusive examples, by using electromagnetic energy, such as electromagnetic energy having wavelengths in the radio frequency, microwave, and optical (both visible and invisible) domains.

In the present disclosure, the phrase "A and B are different" may mean "A and B are different from each other". The terms such as "leave" "coupled" and the like may be interpreted as well.

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, where translations add articles, such as a, an, and the in English, the present disclosure may include that the noun that follows these articles is in the plural.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description in the present disclosure is provided only for the purpose of explaining examples, and should by no means be construed to limit the invention according to the present disclosure in any way.

The invention claimed is:

1. A terminal comprising:
a receiving section that receives one or more downlink control channels used for scheduling of a plurality of downlink shared channels respectively transmitted using a plurality of transmission configuration information (TCI); and
a control section that detects, based on a hybrid automatic repeat request (HARQ) process number field included in downlink control information transmitted on the downlink control channel, a HARQ process number managed by one or more independent HARQ entities for each cell.

2. The terminal according to claim 1, wherein the receiving section receives the downlink control information, and wherein a HARQ process number managed by an independent HARQ entity for each cell is mapped to a HARQ process number field included in the downlink control information.

3. The terminal according to claim 1, wherein the receiving section receives a plurality of the downlink control channels, and wherein a HARQ process number managed by an independent entity for each cell is mapped to a HARQ process number field included in downlink control information respectively transmitted on the plurality of the downlink control channels.

4. The terminal according to claim 3, wherein whether or not the plurality of downlink shared channels is scheduled by a plurality of downlink control channels is configured by higher layer signaling.

5. A radio communication method for a terminal, comprising:
   receiving one or more downlink control channels used for scheduling of a plurality of downlink shared channels respectively transmitted using a plurality of transmission configuration information (TCI); and
   detecting, based on a hybrid automatic repeat request (HARQ) process number field included in downlink control information transmitted on the downlink control channel, a HARQ process number managed by one or more independent HARQ entities for each cell.

6. A base station comprising:
   a transmitting section that transmits one or more downlink control channels used for scheduling of a plurality of downlink shared channels respectively transmitted using a plurality of transmission configuration information (TCI); and
   a control section that controls, by using a hybrid automatic repeat request (HARQ) process number field included in downlink control information transmitted on the downlink control channel, reporting of a HARQ process number managed by one or more independent HARQ entities for each cell.

7. A system comprising a terminal and a base station, wherein
   the terminal comprises:
      a receiving section that receives one or more downlink control channels used for scheduling of a plurality of downlink shared channels respectively transmitted using a plurality of transmission configuration information (TCI); and
      a control section of the terminal that detects, based on a hybrid automatic repeat request (HARQ) process number field included in downlink control information transmitted on the downlink control channel, a HARQ process number managed by one or more independent HARQ entities for each cell, and
   the base station comprises:
      a transmitting section that transmits the one or more downlink control channels; and
      a control section of the base station that controls, by using the HARQ process number field included in the downlink control information, reporting of the HARQ process number.

* * * * *